United States Patent [19]
Yoshino et al.
[11] 3,927,269
[45] Dec. 16, 1975

[54] TIME DIVISION MULTIPLEXING TRANSMISSION SYSTEM

[75] Inventors: Takehiko Yoshino, Yokohama; Akio Yanagimachi, Kawasaki; Takashi Uehara, Inagi; Teruhiro Takezawa, Komae; Masaaki Fukuda, Kodaira; Tatsuo Kayano, Hachioji, all of Japan

[73] Assignees: Nippon Hoso Kyokai Hitachi Ltd.; Hitachi Electronics Ltd., both of Tokyo, Japan

[22] Filed: Dec. 21, 1973

[21] Appl. No.: 427,219

[30] Foreign Application Priority Data

Dec. 29, 1972 Japan .............................. 48-3227

[52] U.S. Cl. .............................. 179/15 BS
[51] Int. Cl.² .............................. H04J 3/06
[58] Field of Search .............................. 179/15 BS

[56] References Cited

UNITED STATES PATENTS 3,441,674 4/1969 Giordano .............................. 179/15 BV

*Primary Examiner*—Ralph D. Blakeslee
*Attorney, Agent, or Firm*—Stevens, Davis, Miller & Mosher

[57] ABSTRACT

In a time division multiplexing transmission system for transmitting video signals and a plurality of channels of PCM-TDM audio signals alternately, the video and audio signals being divided into video and audio frames, each of which has an equal time duration of a predetermined unit frame period, and the video and audio signals being transmitted in a sequence of one video frame and subsequently first and second audio frames, two groups of audio signals are multiplexed in time division in the form of a PCM signal so as to form first and second signal series of PCM-TDM audio signals, each of which series contains a plurality of PCM frames having a PCM frame period equal to an integer ratio of a predetermined period of the horizontal synchronizing signal and including a plurality of PCM time slots to which the PCM-TDM audio signals are allotted in a predetermined PCM time slot sequence in which a real signal to be reproduced directly and a memory signal to be reproduced after temporary storage are gathered separately to one another, under control of a PCM synchronizing signal having a period equal to an integer ratio of the predetermined period, whereby the configuration of apparatus for regenerating synchronizing signals in a receiver can be simplified and also the receiver can be manufactured easily and cheaply.

23 Claims, 45 Drawing Figures

TIME DIVISION MULTIPLEXING TRANSMISSION SYSTEM

CROSS-REFERENCE TO RELATED APPLICATION

This invention is related to the subject matter of the following co-pending application which is incorporated by reference herein and which is assigned to the assignee of the present invention: Ser. No. 361,581, filed May 18, 1973, now U.S. Pat. No. 3,854,010.

BACKGROUND AND BRIEF DESCRIPTION OF THE INVENTION

The present invention relates to an improved time division multiplexing transmission system and more particularly relates to a time division multiplexing transmission system for transmitting video signals of a plurality of still pictures and pulse code modulated (PCM) audio signals related thereto by turns at a time rate of, for example one to two television frames.

A type of broadcasting which is able to conform with the needs of the variety and individuality of human life can be considered one of the ideals of future broadcasting. Super multiplexing still picture broadcasting elicits great interest of broadcasters and educators as an economical and technological means through which a great deal of information can be conveyed.

The concept of still picture transmission by television signals has been reported by W. H. Hughes et al., at Oklahoma State University. This system has been planned for a cable transmission system which is capable of two-way transmission. But, they did not report the details of sound transmission. In most cases, it is advantageous to transmit the sound together with the picture because, in general, watching television without sound does not use the human senses well, and it is less effective for viewers. Therefore, it has been desired to develop a novel transmission system of still pictures and corresponding sounds in order to study the most effective use of still picture broadcasting and the acceptability of still pictures by viewers.

The present invention is to provide a novel transmission system which can transmit still pictures together with sounds related thereto. It should be noted that the present invention is not limited to a transmission system for still pictures and their related sounds, but may be used to transmit information signals, such as television video signals, facsimile signals or audio signals which are divided into scanning periods and any other time division multiplexed information signals in the form of PCM, PPM (pulse position modulation), PWM (pulse width modulation) or PAM (pulse amplitude modulation) signals. However, for the sake of explanation, in the following description the transmission system for transmitting still pictures and related sounds as television signals through a television transmitting path will be explained. That is to say, video signals of still pictures and audio PCM signals are transmitted on the same transmission path at a rate of one to two television frames of the NTSC system. Thus video signals of each still picture are transmitted in one frame period (1/30 second) as quasi-NTSC signals and audio PCM signals are transmitted in successive two frame periods (1/15 second). A plurality of still pictures and their related sounds constitute a signal group termed as a program. At a transmitter end, this program is transmitted repeatedly and at a receiver end one can select a desired still picture and its related sound from the transmitted program. At the transmitter end there may be provided a plurality of programs and a first program is transmitted repeatedly in a given time period and then a second program is transmitted repeatedly in a next given time period and so on. And at the receiver end one can select a desired program from a plurality of programs. A time duration of a program is established within consideration of various factors such as amounts of information to be transmitted, i.e., the number of still pictures, necessary time duration of sounds, etc., property of a transmission path and its bandwidth, complexity of apparatuses at transmitter and receiver ends, pemissible access time (permissible waiting time) on the basis of psychological characteristic of viewers. In the embodiment described hereinafter, a time duration of a program is determined to be 5 seconds.

In the still picture-audio PCM multiplexing transmission system, if the frequency of a horizontal synchronizing signal for the video signal is equal to that of the PCM frame synchronizing signal, after the synchronization is once established the synchronization can easily be maintained in video signal periods and also in audio signal periods. However, a transmission bandwidth of the transmission path is limited and the audio signal must be transmitted in the given number of channels, so that the frequency of the PCM frame synchronizing signal, i.e., the frequency of an audio sampling signal must be determined on account of the transmission bandwidth and the number of channels. This results in that the frame frequency of the audio PCM signal is not always identical with the horizontal synchronizing frequency of the video signal.

Besides the above mentioned transmission system for transmitting the still pictures and their related sounds, there are many transmission systems in which a first information signal and a second information signal are transmitted by turns at a given time rate and a frequency of a synchronizing signal for the first information signal differs from that for the second information signal. For example, if a facsimile signal of high quality and a facsimile signal of low quality are transmitted in turn at a certain time rate, a sampling frequency, i.e., a primary scanning frequency of the high quality facsimile signal must be higher than that of the low quality facsimile signal. In such a case at a receiver end both of these sampling frequencies must be reproduced in order to establish a correct synchronization.

In the time division multiplexing transmission system described in the aforementioned co-pending application Ser. No. 361,581, the first and second information signals are transmitted by turns at a time rate of an arbitrary integer ratio, said first and second information signals being divided at periods of first and second signals, wherein a frequency of a synchronizing signal for the first information signal can be different from that for the second information signal. At a transmitter end there are provided means for producing said first and second signals and means for forming a digital synchronizing signal having a given relation to said first and second signals, said digital synchronizing signal being composed of synchronizing information consisting of a pulse chain having a given repetition frequency and a control signal also consisting of a pulse chain. At a receiver end said synchronizing information is firstly extracted from an incoming signal and then said control signal is extracted on the basis of said already extracted synchronizing information so as to produce first and second synchronizing signals having frequencies which are equal to those of said first and second signals, respectively and said first and second information signals are reproduced by means of said first and second synchronizing signals. Hence, the configuration of the receiver disclosed in the co-pending application Ser. No. 361,581 is forced to be complicated and to be highly costly.

The present invention has for its object to improve the transmission system described in the co-pending application Ser. No. 361,581 by obviating the above mentioned drawbacks.

It is another object of the invention to provide a time division multiplexing transmission system for alternately transmitting first and second information signals after dividing at periods of first and second signals, wherein a frequency of a synchronizing signal for the first information signal is made equal to that for the second information signal, so as to simplify the configuration of means for regenerating synchronizing signals at the receiver end.

It is further another object of the invention to provide a time division multiplexing transmission system, wherein a single kind of synchronizing signal is commonly employed throughout the transmission period so as to easily reproduce said first and second information signals, respectively, by means of a sole means for reproducing a synchronizing signal at the receiver end.

BRIEF DESCRIPTION OF THE DRAWINGS

The present invention will be completely understood by reference to the following detailed description, taken in conjunction with the accompanying drawings, in which.

DETAILED DESCRIPTION OF THE INVENTION

Figure 1A:
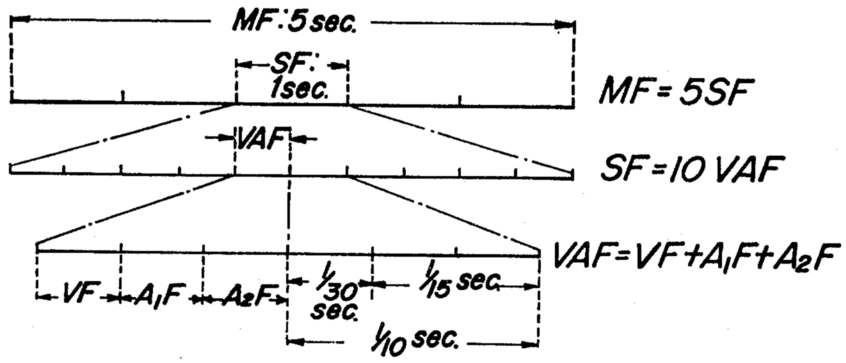
FIG. 1*a* shows constructions of a master frame, a sub-frame and a video-audio frame of video and audio signals transmitted by a time division multiplexing transmission system according to the invention.
Figure 1B:
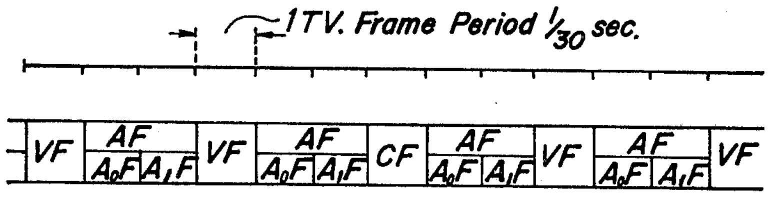
FIG. 1*b* illustrates a portion of said signal which includes a control frame and FIG. 1*c* shows a manner of effecting an audio PCM signal allocation.
Figure 1C:
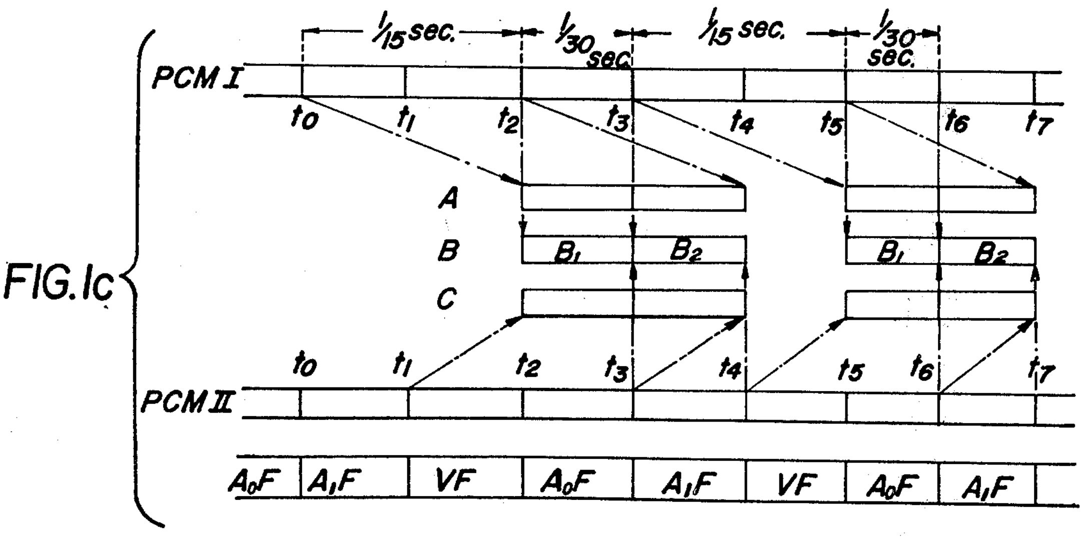

Now a basic construction of the transmitting system according to the invention will be firstly explained with reference to FIGS. 1 to 5. FIGS. 1*a* – 1*c* show a format of the video-audio multiplexed signal to be transmitted. FIG. 1*a* denotes a program of 5 seconds. The program is termed as a master frame MF. The master frame MF consists of five sub-frames SF, each of which has a duration of one second. As shown in FIG. 1*a*, each sub-frame SF consists of 10 video-audio frames VAF and each video-audio frame VAF has a duration of 1/10 second. As illustrated in FIG. 1*a*, each video-audio frame VAF further consists of a video frame VF of one television frame period (1/30 second) and an audio frame AF of two television frame periods (1/15 second). Each audio frame AF further consists of a first audio frame $A_1F$ and a second audio frame $A_2F$, each having one television frame period (1/30 second). Thus the master frame MF is composed of 150 television frames.

By constructing the master frame MF as mentioned above, in the master frame MF, there may be inserted 50 still pictures. However, in fact, it is necessary to transmit code signals for identifying still pictures and their related sounds and for indicating timings of starts and ends of various signals. It is advantageous to transmit such code signal in the video frames VF rather than in the audio frames AF. In the present embodiment, code signals are transmitted in a video frame VF of each sub-frame SF. A frame during which the code signals are transmitted is referred to as a code frame CF. FIG. 1*b* shows a part of the sub-frame SF which includes said code frame CF. Therefore, in the master frame MF, there are inserted 45 still pictures and thus it is required to transmit 45 sounds related thereto, i.e., 45 channels of audio signals.

Sound like speech or music needs several seconds or more to give some meaning, because sound is inherently continuous. In the present embodiment an average duration of each sound relating to each still picture is limited to ten seconds. As mentioned above the master frame MF has a duration of only 5 seconds, so that in order to transmit sounds of 10 seconds it is necessary to use the number of channels twice the number of sound channels. That is in order to transmit sounds of 45 channels relating to 45 still pictures, it is required to establish 90 audio channels. Moreover, it is impossible to transmit audio signals in the video frames VF. Therefore, PCM audio signals must be divided and allocated in the audio frames AF only. In order to effect such an allocation treatment for audio signals, the PCM audio signals of 90 channels are divided into two groups PCMI and PCMII as shown in FIG. 1*c*. Portions of PCMI corresponding to the second audio frames $A_2F$ and the video frames VF are delayed for two television frame periods of 1/15 second and portions of PCMII corresponding to the video frames VF and the first audio frames $A_1F$ are delayed for one television frame period of 1/30 second. PCM signals thus delayed form audio channels A and C as illustrated in FIG. 1*c*. Portions of PCMI and PCMII which correspond to the first audio frames $A_1F$ and the second audio frames $A_2F$, respectively are directly inserted in audio channels $B_1$ and $B_2$ to form an audio channel B. In this manner in the audio channels A, B and C, there are formed vacant frames and these vacant frames correspond to the video frames VF. By effecting such an allocation for the audio signals, in each audio frame AF it is necessary to establish a number of audio channels which is 1½ times the number of the audio signal channels. In the present embodiment, 135 audio channels have to be provided in each audio frame AF. In this manner, audio signals of 135 channels are inserted in each audio frame AF in the form of PCM signals allocated in given time slots.

An embodiment of a transmitting apparatus for effecting the above mentioned still picture - PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is applied to a frequency-modulator 5 and frequency-modulates a carrier by the video signal. The FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radial direction above the surface of the disc memory 11. The disc memory 11 is preferably made of a plastic disc having coated a magnetic layer thereon. This kind of memory has been described in detail in an NHK Laboratories Note, Ser. No. 148, "Plated magnetic disc using plastic base"; December, 1971. The disc 11 is rotatably driven by a motor 15 at a rate of 30 rounds per second. There is further provided an air-bearing type floating head 17 for reproducing video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensated video signal is supplied to a video input terminal of a video-audio multiplexer 27.

The audio signal processing system comprises an audio tape recorder 29 of the remote controlled type. On this type recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . **33-*n*. The amplified audio signals from the amplifiers 33-1, 33-2, 33-3 . . . 33-*n* are supplied to audio recording heads 35-1, 35-2, 35-3 . . . 35-*n*, respectively. There is provided an audio recording magnetic drum 37 which is rotated by a driving motor 39 at a rate of one revolution for 5 seconds. As already described above each sound corresponding to each still picture lasts for 10 seconds, so that each audio signal of each sound is recorded on two tracks of the magnetic drum 37 by means of each pair of audio recording heads 35-1, 35-2; 35-3, 35-4; . . . 35-*n*. That is a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37**.

The audio signals recorded on the drum 37 are simultaneously reproduced by audio reproducing heads 41-1, 41-2, 41-3 . . . **41-*n*, the number of which corresponds to the number of the audio recording heads 35-1, 35-2 . . . 35-*n*. In the present embodiment $n$=90. The reproduced audio signals are amplified by reproducing amplifiers 43-1, 43-2, 43-3 . . . 43-*n*. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49** in which the PCM audio signal is allocated in the audio frames AF as explained above with reference to FIG. 1*c*. The detailed construction and operation of the audio allocation processor 49 will be explained later. The PCM audio signal supplied from the processor 49 is a two-level PCM signal. This two-level PCM signal is converted in a two-four level converter 51 into a four-level PCM signal. The four-level PCM audio signal is supplied to an audio signal input terminal of the video-audio multiplexer 27. In the multiplexer 27, the video signal from the time-error compensator 25 and the four-level PCM audio signal from the 2-4 converter 51 are multiplexed in a time division mode. A multiplexed video-audio signal from the multiplexer 27 is supplied to a code signal adder 53 which adds to the multiplexed video-audio signal the code signal for selecting desired still pictures and their related sounds at a receiver end to form the signal train shown in FIG. 1*b*. The signal train from the code signal adder 53 is further supplied to a synchronizing signal adder 55 in which a digital synchronizing signal is added to form an output video-audio signal to be transmitted.

Figure 2:
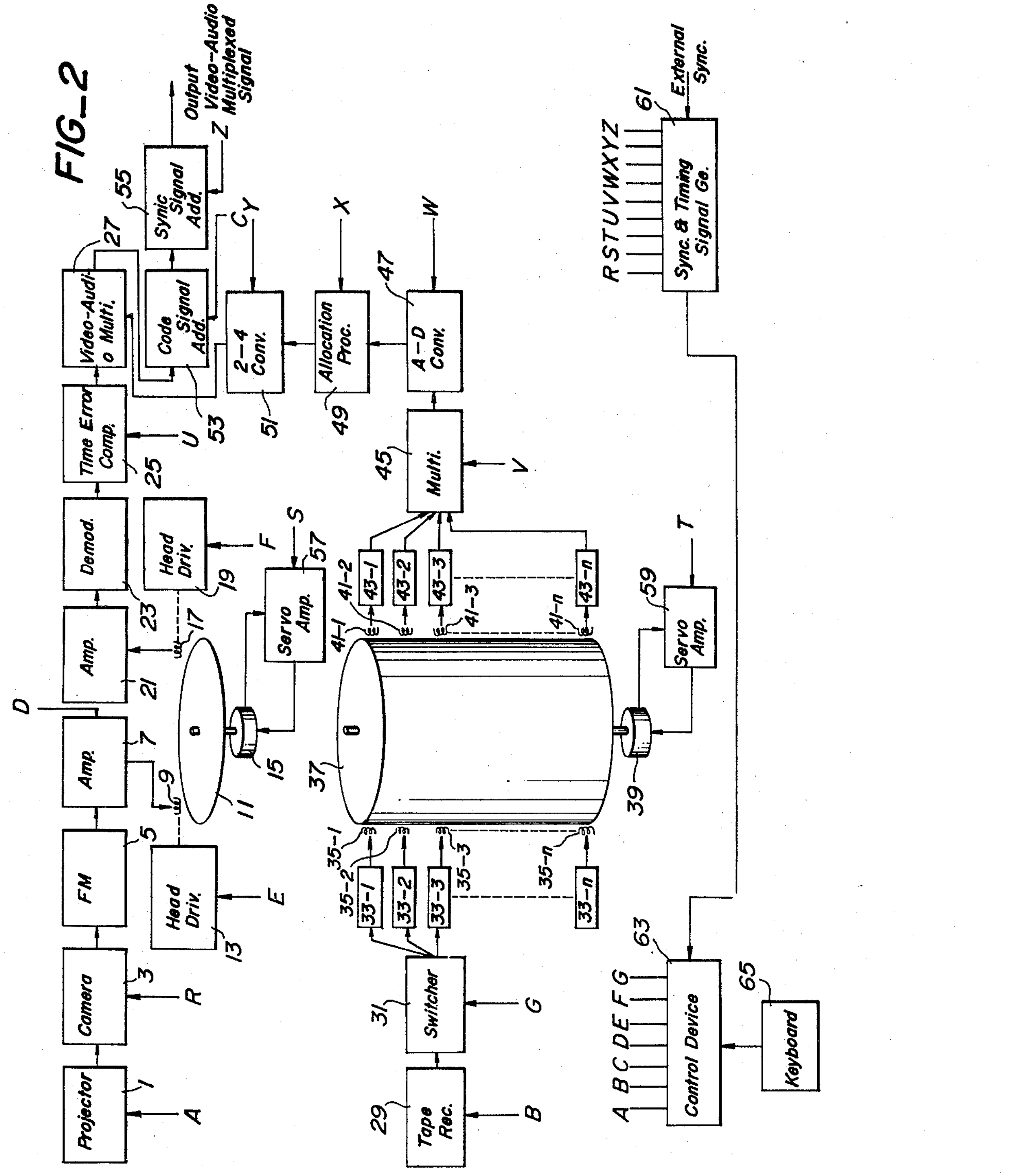
FIG. 2 illustrates diagrammatically a basic construction of an embodiment of a transmitmter according to the invention.

In the transmitting apparatus shown in FIG. 2, there are further provided servo amplifiers 57 and 59 so as to maintain the rotation of the video disc memory 11 and the audio magnetic drum 37 to be constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively.

The timing signals R, S, T and U are video synchronizing signals having horizontal and vertical synchronizing signals and a color subcarrier. These video synchronizing signals are formed by a conventional television synchronizing signal generator as the signals R,S,T and U which have respective delay times with respect to the corresponding apparatuses to which the signals are applied. The signal V is a switching pulse for selectively applying the output signals of the reproducing amplifiers 43-1 – 43-*n* to the A-D converter 47 during one sampling period synchronized with the external synchronization. The signal W is a start pulse for starting the A-D converter 47 in synchronism with the switching pulse V. The signal X comprises a gating pulse for controlling the gates 67, 69, 71 and 73 which will be described hereinafter with reference to FIG. 3 and a clock pulse for driving the delay circuits 75 and 77 in FIG. 3. The signal Y is a clock pulse for driving the 2-4 converter 51. The signal Z is a digital synchronizing signal shown in FIG. 7 which will be explained hereinafter. These signals R-Z are formed from the external synchronizing signal. The generator 61 further supplies synchronizing and timing signals to a control device 63 which controls selection of still pictures and sounds, recording, reproducing and erasing of video and audio signals, generation of the code signal, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively. These signals A – G are formed by the control device 63 to which the timing pulse from said generator 61 and the instruction signals from the keyboard 65 are applied. The signal A is the control signal for changing the still picture to be presented by the slide projector 1. The signal B is the control signal for controlling start and stop of the tape recorder 29 under the instruction from the keyboard 65. The signal C is the code signal for picture identification which is produced in the case of receiving the signal from the generator 61. The signal D is a control signal for transferring one frame picture from the amplifier 7 to the head 9, following the instruction from the keyboard 65. The signals E and F are served to drive the driving mechanisms 13 and 19 so as to change track location of the heads 9 and 17 respectively. The signal G is a switching signal for selectively operating the amplifier 33-1 – 33-*n* at every one rotation of the magnetic drum 37 so as to sequentially record the reproduced signals from the tape recorder 29 on *n* tracks.

Figure 3:
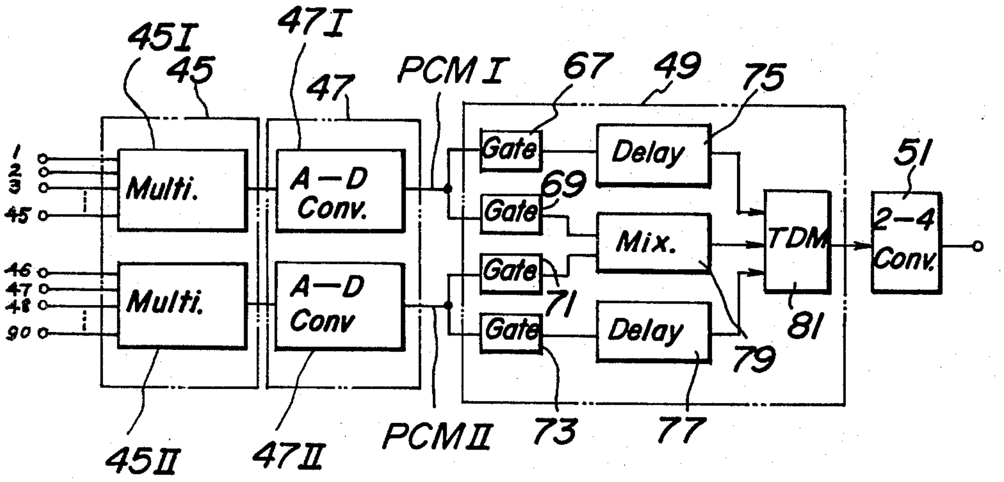
FIG. 3 is a block diagram showing a detailed construction of an audio allocation processor shown in FIG. 2.

FIG. 3 shows a detalied construction of the audio allocation processor 49. In FIG. 3, there are also shown the multiplexer 45, the A-D converter 47 and the 2-4 level converter 51. When independent audio signals of 90 channels are to be transmitted, they are divided into two groups each including 45 channels. These audio signals are supplied to a pair of multiplexers 45I and 45II and a pair of A-D converters 47I and 47II, respectively, to form a pair of PCM time division multiplexing signals PCMI and PCMII as shown in FIG. 1c.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal from the synchronizing and timing generator 61 shown in FIG. 2 that the gate 67 is opened for two frame periods $t_0$–$t_2$, $t_3$–$t_5$ . . . and closed for one frame period $t_2$–$t_3$, $t_5$–$t_6$ . . . in each three frame periods. To the gate 69 is applied a gate signal which has a reverse polarity as that of the gate signal supplied to the gate 67, so that the gate 69 is closed for two frame periods $t_0$–$t_2$, $t_3$–$t_5$ . . . and opened for one frame period $t_2$–$t_3$, $t_5$–$t_6$ . . . in each three frame periods. The gate 71 is opened for two frame periods $t_1$–$t_3$, $t_4$–$t_6$ . . . and closed for one frame period $t_0$–$t_1$, $t_3$–$t_4$ . . . in each three frame periods, but delayed for one frame period with respect to the gate 67. The gate 73 is closed for two frame periods $t_1$–$t_3$, $t_5$–$t_6$ . . . and opened for one frame period $t_0$–$t_1$, $t_3$–$t_4$ . . . in each three frame periods, but delayed for one frame period with respect to the gate 69. The construction and operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to form a time division multiplexed signal.

The signal PCMI is gated out by the gate 67 for a period $t_0$–$t_2$ and delayed by the delay circuit 75 for two frame periods to form the signal A shown in FIG. 1*c*. The other signal PCMII is gated out by the gate 73 for a period $t_1$–$t_3$ and delayed by the delay circuit 77 for one frame period to form the signal C shown in FIG. 1*c*. Moreover, a signal portion of the PCMI for a period $t_2$–$t_3$ is gated out by the gate 69 to form the signal $B_1$ shown in FIG. 1*c* and a signal portion of the PCMII for a period $t_3$–$t_4$ is gated out by the gate 71 to form the signal $B_2$ also shown in FIG. 1*c*. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the 2-4 level converter 51.

In the manner mentioned above, it is possible to form a vacant frame for a period $t_1$–$t_2$ and the video signal can be transmitted in such a vacant frame.

In the transmitting apparatus mentioned above, the random access slide projector 1 is controlled by the control device 63 to project successive 45 still pictures and the video recording head 9 is driven by the mechanism 13 so as to face tracks of the disc memory 11. In this case, the video recording head 7 moves in one direction to face alternate 23 tracks so as to record 23 still pictures and then moves in an opposite direction to face the remaining 22 tracks which are situated between the tracks on which the video signals of the first 23 still pictures have been recorded. The video recording amplifier 7 receives a gate signal D of 1/30 second from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timiing signal S supplied from the generator 61. The video reproducing head 17 is driven by the mechanism 19 in the same manner as the video recording head 9. The reproducing head 17 is moved in the audio frame and code frame periods and is stopped in the video period to reproduce the video signal in a correct manner. The reproducing head 17 repeatedly reproduces the video signal of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording a d.c. current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Figure 4:
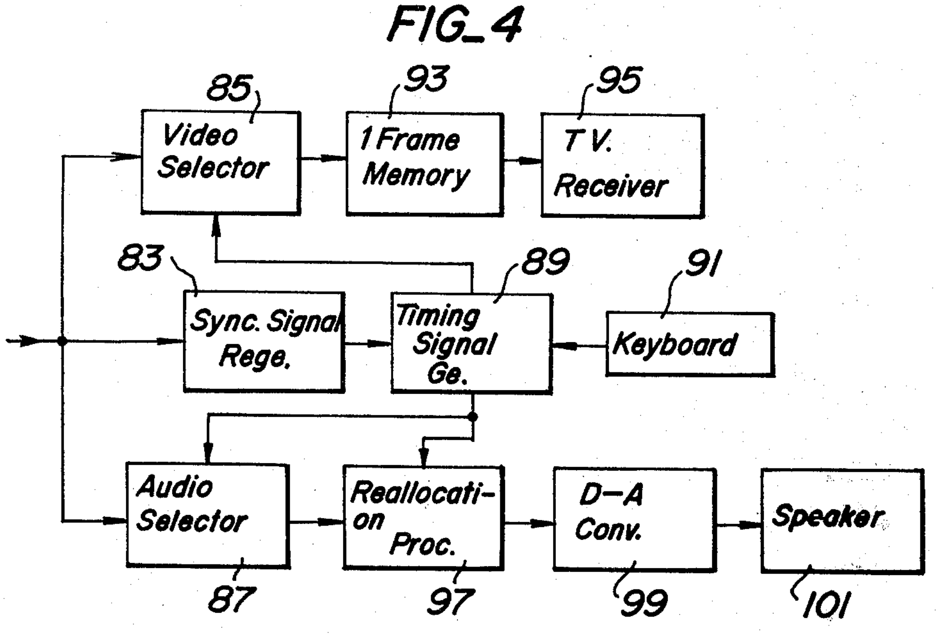
FIG. 4 is a block diagram showing a principle construction of a receiver according to the invention.

Next, a basic construction of a receiver will be explained with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. The timing signal generator 89 of this invention is similar to the synchronizing pattern detector explained in the above-mentioned copending application Ser. No. 361,581, from page 57, line 15 to page 59, line 1 with reference to FIG. 20 of the same application. To the timing signal generator 89 is also connected an instruction keyboard 91. The timing signal generator 89 produces timing signals to the video selector 85 and the audio selector 87 on the basis of the synchronizing signal from the regenerator 83 and the instruction from the keyboard 91. The video selector 85 selects a desired video signal and the audio selector 87 selects a desired audio signal related to the desired video signal. The selected video signal of the desired still picture is temporarily stored in a one frame memory 93. The video signal of one frame period is repeatedly read out to form a continuous television video signal. This television video signal is displayed on a television receiver 95.

The selected audio PCM signal is supplied to an audio reallocation processor 97 to recover a continuous audio PCM signal. The audio PCM signal is supplied to a D-A converter 99 to form an analogue audio signal. This audio signal is reproduced by, for example, a loud speaker 101.

Now the operation of the receiver will be explained in detail with reference to FIG. 5 showing various waveforms.

In the synchronizing signal regenerator 83, PCM bit synchronizing signals and PCM frame synchronizing signals are reproduced in the manner which will be described later in detail together with gate signals shown in FIGS. *5b*, *5c* and *5d*. The timing signal generator 89 detects a picture identification code VID which has been transmitted in a vertical flyback blanking period at a foremost portion of the picture transmission frame period VF. As shown in FIG. *5a*, the picture identification code $\alpha$ for the picture P$\alpha$, the picture identification code $\beta$ for the picture P$\beta$ and so on are transmitted at the foremost portions of the picture transmission frame periods VF. The timing signal generator 89 compares the detected picture identification code VID with a desired picture number, for example, $\beta$ instructed by the keyboard 91. If they are identified to each other, the timing signal generator 89 produces a coincidence pulse shown in FIG. *5e*. The coincidence pulse is prolonged by a monostable multivibrator circuit as shown by a dotted line in FIG. *5e* and the prolonged pulse is gated out by the gate signal shown in FIG. *5b* to form a video gate signal illustrated in FIG. *5f*. The video gate signal is supplied to the video selector 85 to gate out the video signal P$\beta$ in a desired video frame and the video signal P$\beta$ thus selected is stored in the one frame memory 93. In the memory 93, the video signal P$\beta$ is repeatedly read out so that the continuous video signal shown in FIG. *5g* is supplied to the television receiver 95. Thus the television receiver 95 displays the video signal P$\beta$ as a still picture instead of the picture P$\eta$ which has been displayed.

Figures 5A, 5B, 5C, 5D, 5E, 5F, 5G, 5H, 5I, 5J, 5K, 5L, 5M, 5N, 5O:
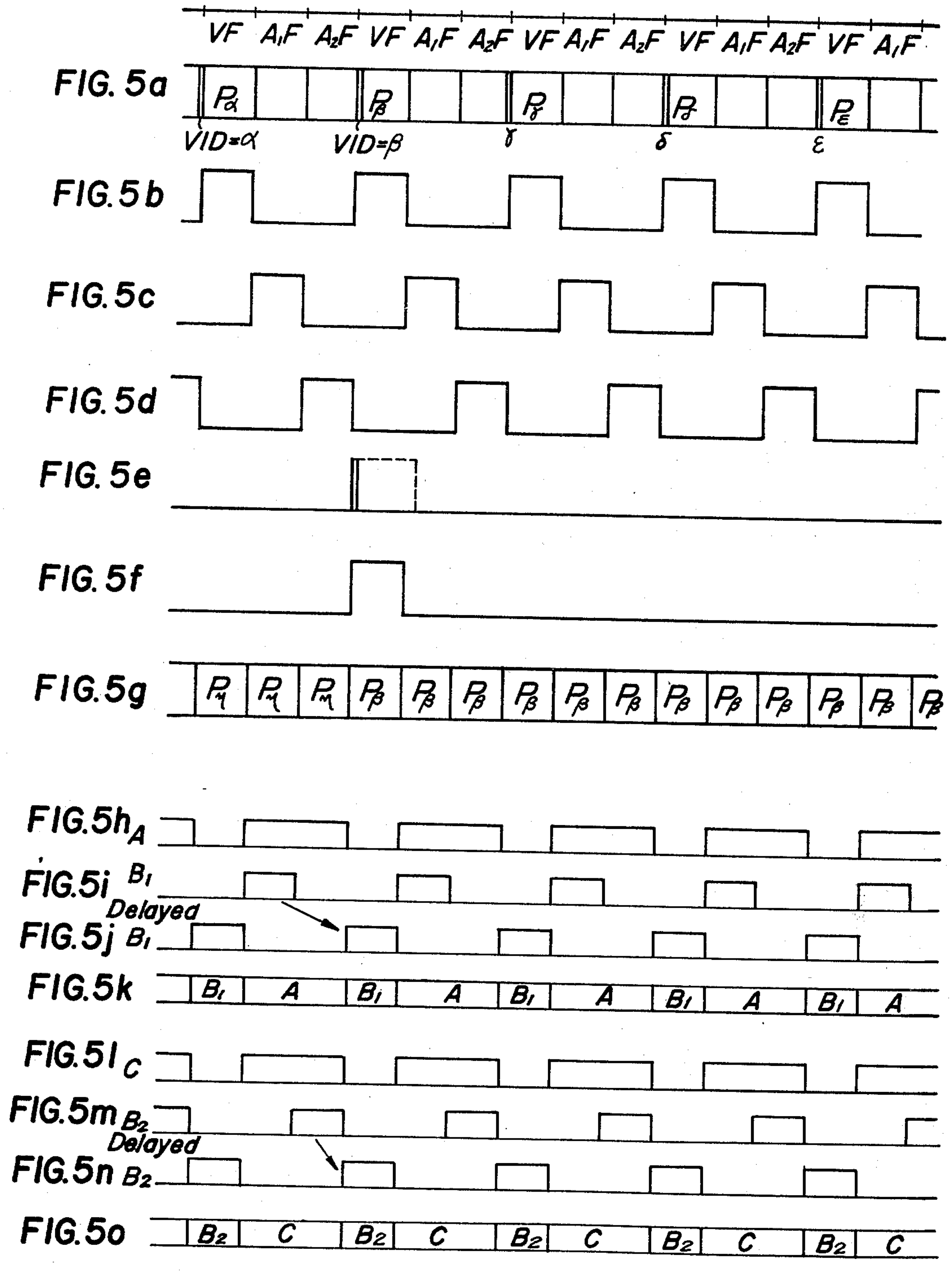
FIGS. 5*a*–5*o* show waveforms for explaining the operation of the receiver shown in FIG. 4.

The audio signal is transmitted in the audio frame periods $A_1F$ and $A_2F$ in the form of a PCM multiplexed signal. The timing signal for selecting desired PCM channels corresponding to the desired picture number, for example, $\beta$ is generated by counting the above mentioned PCM bit synchronizing pulses and PCM frame synchronizing pulses. The timing signal thus generated is supplied to the audio selector 87 to select the desired PCM signal related to the selected still picture. FIG. *5h* illustrates a pulse series of the audio channel A selected by the audio selector 87 and FIG. 5*i* shows a pulse series of the audio channel $B_1$ selected by the audio selector 87 and gated out by the gate signal shown in FIG. 5*c*. The audio reallocation processor 97 supplies the PCM pulse series shown in FIG. 5*h* directly to the D-A converter 99 and also supplies the PCM pulse series of FIG. 5*i* to the D-A converter 99, but after delaying by two television frame periods as shown in FIG. 5*j*. To this end, the timing signal from the generator 89 is supplied to the processor 97. The pulse series shown in FIGS. 5*h* and 5*j* are combined to form a continuous pulse series shown in FIG. 5 *k*. The combined PCM signal is converted to the continuous analogue audio signal by the D-A converter 99.

When the desired sound is transmitted in the channels C and $B_2$, the same operation as above will be carried out as shown in FIGS. 5*l*, 5*m*, 5*n* and 5*o* to form a desired continuous analogue audio signal. The picture number and the PCM channel number may be correlated to each other in such a manner that even number pictures correspond to the audio channels A and $B_1$ an odd number pictures correspond to the audio channels C and $B_2$.

In an embodiment which will be explained hereinafter an audio sampling frequency, i.e. an audio PCM frame synchronizing frequency is determined to be two-thirds of a video horizontal synchronizing frequency of 15.75 KHz. Thus the audio sampling frequency is equal to 10.5 KHz. The sampled audio signal is quantized by 8 bits and then converted ubti a four-level PCM signal and transmitted in a 156 multiplex time slots with a bit frequency of about 6.54 MHz.

Figure 6A:
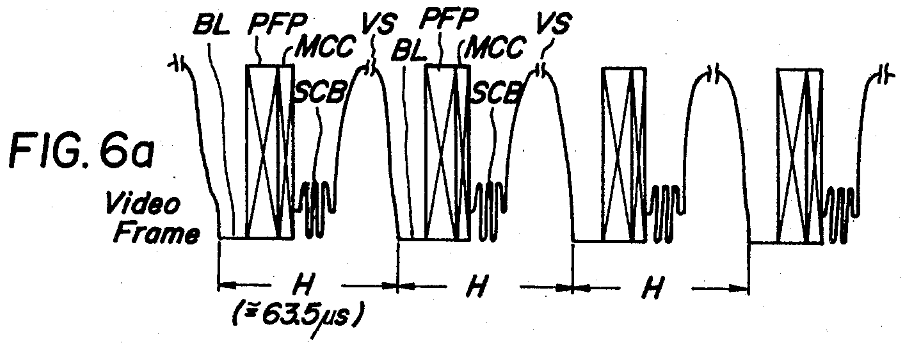
FIG. 6*a* illustrates a waveform of the transmitted signal in a video frame period and FIG. 6*b* shows a waveform of the transmitted signal in an audio frame period.
Figure 6B:
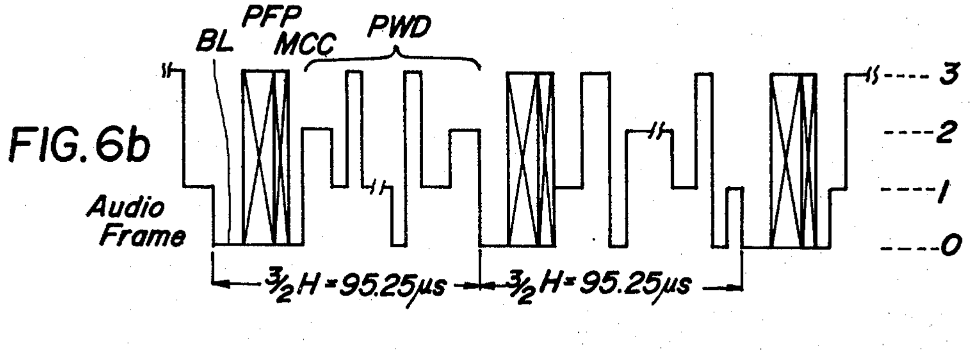

FIG. 6*a* shows a transmission signal in the still picture transmission period and FIG. 6*b* illustrates a transmission signal in the sound transmission period. In these figures a reference BL denotes a blanking pulse, PFP a PCM frame pattern, MCC a mode control code pattern, SCB a color subcarrier burst signal, VS a video signal and PWD a four-level PCM audio signal. The PCM frame pattern PFP and the mode control code pattern MCC construct a digital synchronizing signal DS. In the picture transmission period the blanking pulse BL and the digital synchronizing signal DS are inserted at a position corresponding to a horizontal synchronizing signal at a rate of 63.5 $\mu s$ and in the sound transmission period are inserted at a rate of the sound sampling period of 95.25 $\mu s$.

Figure 7:
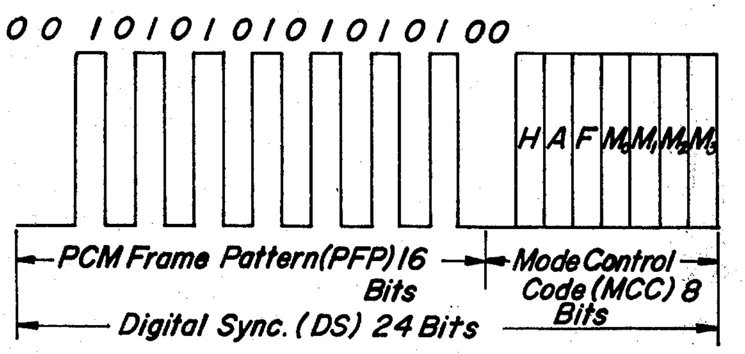
FIG. 7 depicts a waveform of a digital synchronizing signal consisting of a PCM frame synchronizing pattern and a mode control code.

FIG. 7 shows a detailed construction of the digital synchronizing signal DS composed of PFP and MCC. The digital synchronizing signal DS is inserted in both of the picture and sound transmission periods as the same waveform. In other words the digital synchronizing signal DS has the common waveform for both of the video and audio frame periods. The blanking pulse BL is formed by a signal free portion and is used to fix a level of the whole signal. The PCM frame pattern PFP constitutes a given pattern for the PCM frame synchronization of the audio signal and the horizontal synchronization of the video signal. The PCM frame pattern PFP also serves as a timing burst signal TBS for deriving a PCM bit synchronizing signal. For the timing burst signal TBS it is desired to construct the pattern PFP as a regular pattern such as 1010 . . . , but in the present embodiment use is made of a pattern having partially irregular portions such as 00101 . . . 0100, so as to be able to discriminate easily the PCM frame pattern PFP from similar patterns which might occur in the PCM audio signal. The mode control code MCC is a control signal for indicating positions of integer multiples of the horizontal synchronizing period of the video signal and the audio sampling period, positions of the television frame synchronizing signals and kinds of the transmitted signal, i.e., the video signal or the audio signal. As shown in FIG. 7, the mode control code MCC consists of eight code bits O, H, A, F, $M_0$, $M_1$, $M_2$ and $M_3$. The second code bit H indicates coincidence of the horizontal synchronizing signal and the digital synchronizing signal, the third code bit A coincidence of the sound sampling signal and the digital synchronizing signal, the fourth code bit F the television frame synchronizing signal and the remaining code bits $M_0$, $M_1$, $M_2$ and $M_3$ represent kinds of transmitted signals. The code bits $M_0$, $M_1$, $M_2$, $M_3$ become 1, 0, 0, 0 in the picture transmission period, 0, 1, 0, 0 in the first audio frame $A_1F$ and 0, 1, 1, 0 in the second audio frame $A_2F$.

Figures 8A, 8B, 8C, 8D, 8E, 8F, 8G:
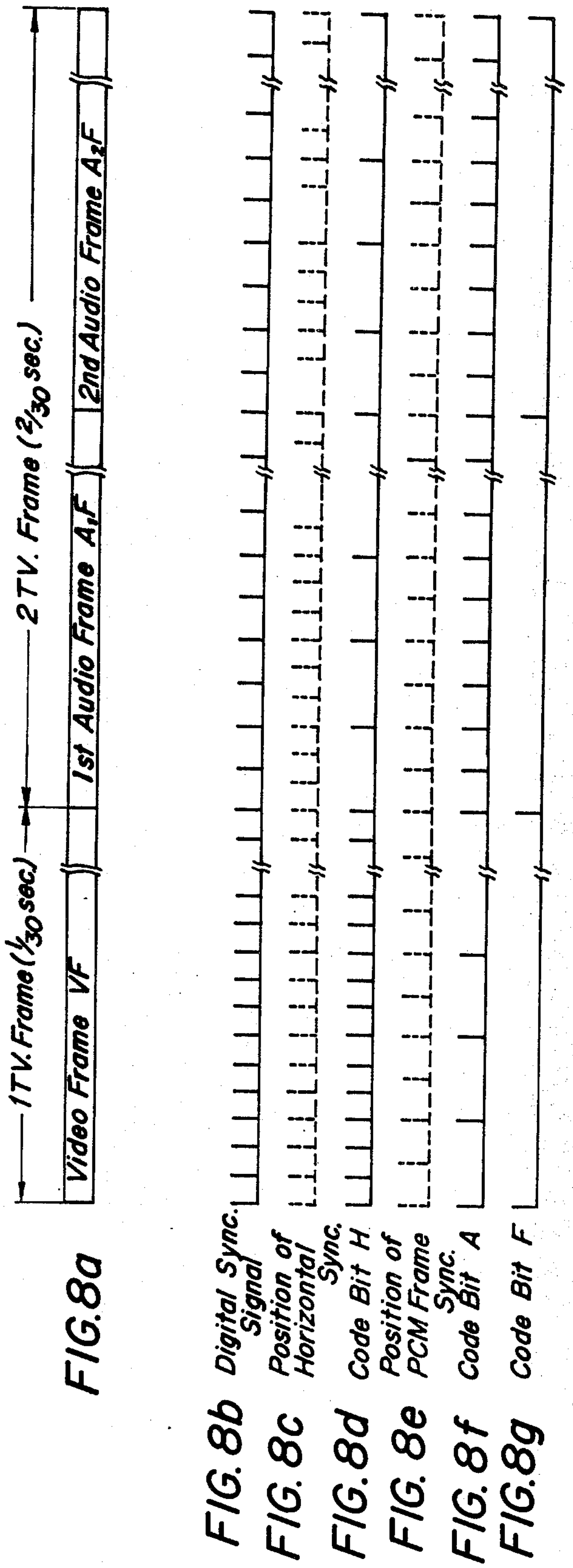
FIG. 8*a* shows a portion of the video-audio signal, FIG. 8*b* a transmission timing of the digital synchronizing signal, FIG. 8*c* imaginary positions of the horizontal synchronizing signal, FIG. 8*d* a first code bit H in the mode control code, FIG. 8*e* imaginary positions of the PCM signal, FIG. 8*f* a second code bit A in the mode control code
FIG. 8*g* illustrates a third code bit F in the mode control code.

FIG. 8*a* shows a portion of the still picture-sound multiplexed signal, FIG. 8*b* transmission timing of the digital synchronizing signal, FIG. 8*c* imaginary positions of the horizontal synchronizing signal, FIG. 8*d* the second code bit H in the mode control code MCC, FIG. 8*e* imaginary positions of the PCM frame synchronizing signal, FIG. 8*f* the third code bit A in the mode control code MCC and FIG. 8*g* illustrates the fourth code bit F in the mode control code MCC. The second code bit H is at a logical level "1" when a timing of the digital synchronizing signal DS coincides with that of the horizontal synchronizing signal and is a logical level "0" when a transmission timing of these synchronizing signals does not coincide with each other. Thus as shown in FIG. 8*d*, in the picture transmission period, i.e., in the video frame VF the code bit H is always at a logical level "1", but in the sound transmission periods, i.e., in the audio frame AF, alternate mode control codes MCC correspond to positions of the horizontal synchronizing signals as shown in FIGS. 8*b* and 8*c*, so that alternate code bits H become a logical level "1" as illustrated in FIG. 8*d*.

The third code bit A in the mode control code MCC is at a logical level "1" when a timing of the sound sampling signal coincides with the digital synchronizing signal DS and is at a logical level "0" when they do not coincide with each other. Therefore, in the sound transmission period, the third code bit A is always at a logical level "1", but in the picture transmission period becomes a logical level "1" once for each three audio sampling periods as shown in FIG. 8*f*.

A preferred embodiment of a device for generating the digital synchronizing signal DS, which device forms a part of the synchronizing and timing signal generator 61 is similar to the corresponding device explained in applicant's aforementioned co-pending application Ser. No. 361,581.

Figure 9:
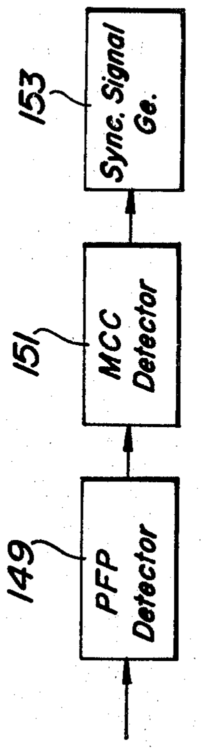
FIG. 9 is a block diagram showing a basic construction of a synchronizing signal regenerating circuit at the receiver end.

FIG. 9 shows a basic construction of a circuit at a receiver end which receives a transmitted signal having the synchronizing signal added thereto and regenerates the synchronizing signal. The received signal is supplied to a PFP detector 149 to detect the PCM frame pattern PFP shown in FIG. 7 in the digital synchronizing signal DS. On the basis of the detected PFP and MCC detector 151 detects the mode control code MCC from the digital synchronizing signal DS. The details of the PFP detector 149 and the MCC detector 151 are similar to the synchronizing pattern detector explained in the aforementioned application Ser. No. 361,581, from page 57, line 15 to page 59, line 1 with reference to FIG. 20 of the same application. By means of these detected PFP and MCC signals there are regenerated from a synchronizing signal regenerator 153 the horizontal synchronizing signal, the sound sampling signal and the vertical synchronizing signal. An embodiment of the synchronizing signal regenerating circuit at a receiver end will be described in detail hereinafter.

In order to reproduce the sound signal by the regenerated sound sampling signal and the regenerated vertical synchronizing signal, the PCM signals in the audio channels A and C (FIG. 1*c*) are directly converted to analogue sound signals during the sound transmission period by D-A conversion. The PCM signals in the audio channels $B_1$ and $B_2$ are temporarily stored, and the thus stored signals are read and reproduced to the continuous sound signals during the picture transmission period by D-A conversion. Thus, the A and C channel signals are termed as real signals R and the B channel signal is termed as a memory signal M, hereinafter. These real and memory signals R and M are transmitted in the manner of the prior art shown in FIG. 10*a*. That is to say, in case that the audio sampling frequency is chosen to be 10.5 KHz, i.e., two-thirds of the video horizontal synchronizing frequency of 15.75 KHz and that the four-level PCM signal with 8-bit quantization is transmitted, if the bit clock frequency is determined to be 6.54 MHz, then 156 multiplex time slots can be obtained during one audio sampling period. The 144 time slots of these 156 time slots are allotted to PCM words PWD, and the remaining 12 slots are allotted to the synchronizing signals and control signals. One time slot is formed with four quits or dibits because one slot contains 8-bits. Moreover, if X is representative of the number of the audio channel, and Y of the number of PCM words PWD, the following formulae are obtained with respect to parts of real and memory signals.

Relating to the real signal:

$$Y = \left\| \frac{X}{2} \right\| \times 3 + 2\times \mathrm{MOD}\ \frac{X}{2} \quad (1)$$

Relating to the memory signal:

$$Y = \left\| \frac{X}{2} \right\| \times 3 + 1 \quad (2)$$

Here, $\| X/2 \|$ is an integral part of X/2, and MOD X/2 is a module of X/2. In addition, if X is an even number, signal transmission is executed only during the $A_1F$ period, and if X is an odd number, signal transmission is executed only during the $A_2F$ period. An example of the relation of said formulae (1) and (2) is shown in the following Table 1 and also illustrated in FIG. 10*a*.

TABLE 1

| Audio channel number (X) | (PRIOR ART) $\|X/2\|$ | MOD X/2 | Audio transmission PWD (Y) Real | Memory |
|---|---|---|---|---|
| 0 | 0 | 0 | 0 | 1 |
| 1 | 0 | 1 | 2 | 1 |
| 2 | 1 | 0 | 3 | 4 |
| 3 | 1 | 1 | 5 | 4 |
| 4 | 2 | 0 | 6 | 7 |

TABLE 1-continued

| Audio channel number (X) | (PRIOR ART) X/2 | MOD X/2 | Audio transmission PWD (Y) Real | Memory |
|---|---|---|---|---|
| 5 | 2 | 1 | 8 | 7 |
| . | . | . | . | . |
| . | . | . | . | . |
| . | . | . | . | . |

Figure 10A:
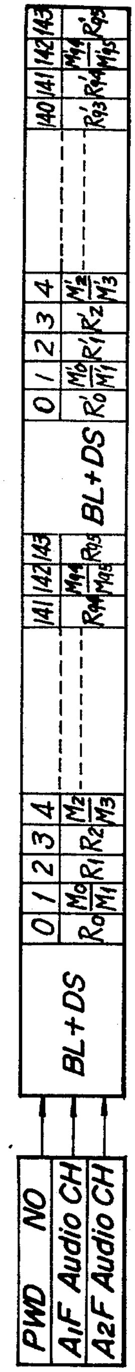
FIGS. 10*a*, 10*b* and 10*c* illustrate word allocations of PCM audio signals of the prior art and of this invention.
Figure 10B:
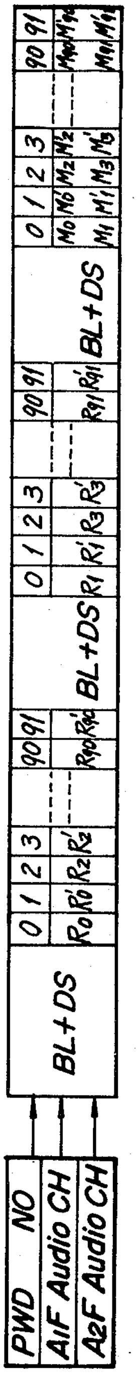
Figure 10C:
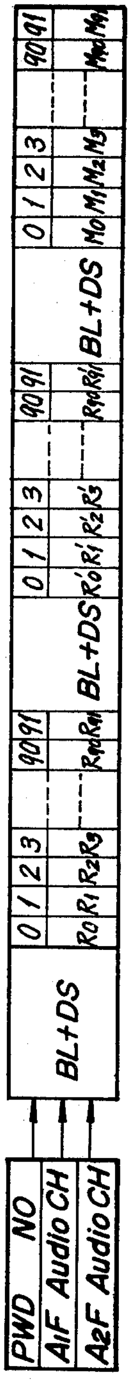

In a time division multiplexing transmission system according to this invention, only one kind of synchronizing signal having a horizontal scanning frequency is inserted into an information signal to be transmitted, even if the horizontal synchronizing frequency $f_h$ and the audio sampling signal $f_{sa}$ are different from one another. It is, however, difficult to reproduce the original audio signal if the synchronizing signal is inserted simply with the period of horizontal scanning. In order to avoid this difficulty, the present invention aims at the allocation of the signals during the sound transmission period so as to form a periodicity of the horizontal scanning period in the sound signals. FIGS. 10*b* and 10*c* show an embodiment according to this invention in which this invention is applied to the case of the ratio of the picture transmission period to the audio transmission period being 1:2 and the audio sampling frequency being $f_{sa} = \frac{2}{3} f_h$, as shown in FIGS. 6, 7 and 8. That is, in FIG. 10*b*, one unit period during which the signals are rearranged is determined to be a period equal to two sampling periods which is the L.C.M. (least common multiple) of the horizontal synchronizing period and the audio sampling period. In the first one horizontal synchronizing period within the sound transmission period only the PCM words PWD corresponding to real signals in the even channels during said two sampling periods are gathered. In the second one horizontal synchronizing period within that period only the PCM words PWD corresponding to real signals in the odd channels during the same two sampling periods are gathered. In the third one horizontal synchronizing period within that period only the PCM words PWD corresponding to the memory signals are gathered. In this case, if 12 slots are allocated to the synchronizing signals and control signals as described above, the number of the total audio channels which can transmit information is 92.

FIG. 10*c* shows another example of signal rearrangement, wherein tthe PCM words PWD in the real signals during the first sampling period in the unit period is gathered in the first horizontal synchronizing period, the PCM words PWD in the real signals during the second sampling period in the unit period are gathered in the second horizontal synchronizing period, and the PCM words PWD corresponding to the memory signals during the third sampling period are gathered.

The period of inserting the synchronizing signals having common waveform according to this invention is always equal to the horizontal synchronizing period throughout the both periods of picture and sound, so that the H bit in the mode control code MCC in FIG. 7 is not required. In this invention, hereinafter, the synchronizing signal inserted commonly in the both transmission periods of picture and sound and having the horizontal synchronizing period is termed as a digital synchronizing signal DS and this period is named as a digital frame period.

Here, described is the method of how to choose the pulse transmission frequency $f_p$ and the sampling frequency $f_{sa}$ of the PCM audio signal, in case of further multiplexing in time division the picture signal and the PCM audio signal.

Figure 11:
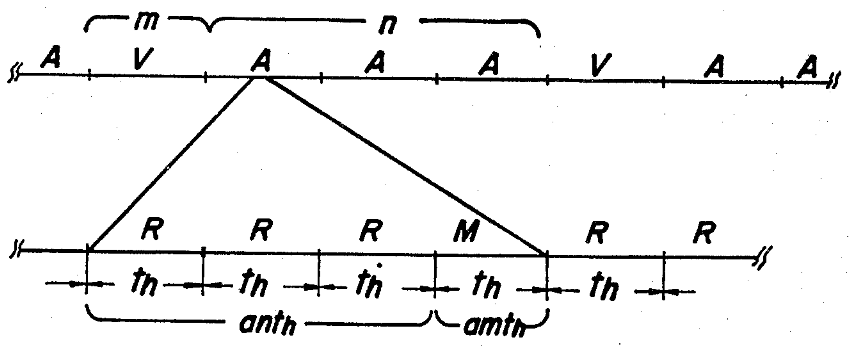
FIG. 11 illustrates signal distribution between the real and memory signal portions in the case of the ratio between picture and audio transmission periods being *m:n;*

First of all, in case of the ratio of division between the picture and audio transmission periods being $m:n$ ($m$ and $n$ are positive integers and prime numbers to one another), it is assumed that the insertion period of the synchronizing signals having common waveforms is made equal to the video horizonal scanning period $t_h$ ($= 1/f_h$). In this case, it is preferable to arrange in such a way that the real signal portions R are allocated to the period $ant_h$ ($t_h$ : one horizontal synchronizing period, $a$: a positive integer) and that the memory signal portions M are allocated to the period $amt_h$, as illustrated in FIG. 11. This signal arrangement results in a good channel selection at the receiver. Namely, at the receiver end, PCM audio signals during $a(m+n)t_h$ are rearranged so as that the real signal portions R are located in the $ant_h$ period and that the memory signal portions M are located in the $amt_h$ period. For this purpose, the audio sampling frequency $f_{sa}$ must have the following relation (3) with respect to the horizontal synchronizing frequency $f_h$.

$$f_{sa} = \frac{b}{a(m+n)} f_h \qquad (3)$$

Here, $b$ is an integer. Moreover, since the time duration in which the picture and audio signals are alternatively transmitted must have a time length of integer multiples of $a(m+n)t_h$, it is necessary that the number K of scanning lines per one picture frame is divisible by $a(m+n)$ without a remainder. That is to say, the following equation is derived.

$$c = \frac{K}{a(m+n)} \qquad (4)$$

Here, $c$ is an integer.

Further, the other required conditions for this invention are similar in some parts to that described in applicant's aforementioned co-pending application Ser. No. 361,581.

Now, an explanation will be given about the manner of how to select the pulse transmission frequency $f_p$ and the audio sampling frequency $f_{sa}$ in the case of said ratio $m:n$ being 1:2 on the basis of the television frame and in the case of the picture signal being the NTSC color television signal.

As the number K of scanning lines belonging to one television picture frame is $525 = 3\times5^2\times7$, the following equation is introduced from said equation (4).

$$c = \frac{K}{a(m+n)} = \frac{3\times5^2\times7}{a\times3} \qquad (6)$$

Here, the number $c$ is required to be an integer, so that the number $a$ is determined such as $a$=1, 5, 7, 25 . . .

Accordingly, in case of $a$=1, the following relation (7) is obtained from said equation (3). Here, $x$ and $y$ are positive integers.

$$\frac{f_{sa}}{f_h} = \frac{x}{y} = \frac{b}{3} \qquad (7)$$

Whereas the pulse transmission frequency $f_p$ must be chosen to be an integer multiple of the horizontal synchronizing frequency $f_h$ and the audio sampling frequency $f_{sa}$, the numbers $I$ and $J$ in the following relations (8) and (9) are required to be positive integers, respectively.

$$I = \frac{f_p}{f_h} = \frac{T}{S} \cdot \frac{f_p}{f_{sc}} = \frac{T}{S} \cdot \frac{Q}{P} \qquad (8)$$

$$J = \frac{f_p}{f_{sa}} = \frac{I\times f_h}{f_{sa}} = \frac{I y O}{S x P} \qquad (9)$$

here, $f_{sc}$ is the frequency of the color sub-carrier, and satisfies the following equations, i.e.,:

$$f_{sc} = T/S(f_h)$$
$$f_p/f_{sc} = Q/P$$

, in which $S$, $T$, $P$ and $Q$ *are respectively positive integers.*

In the case of the NTSC color television signal, T/S = 455/2 is obtained, so that the following relations (10) and (11) are obtained from equations (7), (8) and (9).

$$I = \frac{5\times7\times13Q}{2P} \qquad (10)$$

$$J = \frac{5\times7\times13\cdot Q\cdot3}{2\cdot P\cdot b} \qquad (11)$$

Accordingly, from said equations (10) and (11) is obtained the equation, $Q/P = 4l, 4l/3, 4l/5, 4l/7, \ldots$ ($l$ is a positive integer) when the number $b$ is, for example, 2 ($b$=2).

Next, when $a$=5 is selected, then the following relation is obtained by the same way as described above.

$$J = \frac{5\times7\times13}{2} \cdot \frac{Q}{P} \cdot \frac{15}{b}$$

Hence, if $b$=8, i.e., $f_{sa}/f_h = 8/15$ is chosen, the $Q/P = 8l, 8l/3, 8l/5, 8l/7, 8l/13, \ldots$ is obtained.

Table 2 shows examples of the parameters of the above calculations in the case of the ratio of division between the picture and audio transmission periods being 1:2.

Table 2

| Audio sampling frequency / Horizontal synchronizing frequency $f_{sa}/f_h$ | Audio sampling frequency $f_{sa}$[KHz] | Pulse transmission frequency / Color sub-carrier frequency $f_p/f_{sc}$ | Pulse transmission frequency $f_p$[KHz] |
|---|---|---|---|
| | | 56/35 | 5.727272 |
| | | 48/35 | 4.909090 |
| 1 | 15.734 | 40/35 | 4.090908 |
| | | 56/35 | 4.727272 |
| | | 48/35 | 4.909090 |
| 2/3 | 10.489 | 40/35 | 4.090908 |

Table 2-continued

| Audio sampling frequency / Horizontal synchronizing frequency $f_{sa}/f_h$ | Audio sampling frequency $f_{sa}$[KHz] | Pulse transmission frequency / Color sub-carrier frequency $f_p/f_{sc}$ | Pulse transmission frequency $f_p$[KHz] |
|---|---|---|---|
| | | 56/35 | 5.727272 |
| | | 112/91 | 4.405593 |
| 7/15 | 7.346 | 56/65 | 3.083915 |
| | | 48/35 | 4.909090 |
| 8/15 | 8.3914 | 32/35 | 3.272726 |

Figure 12:
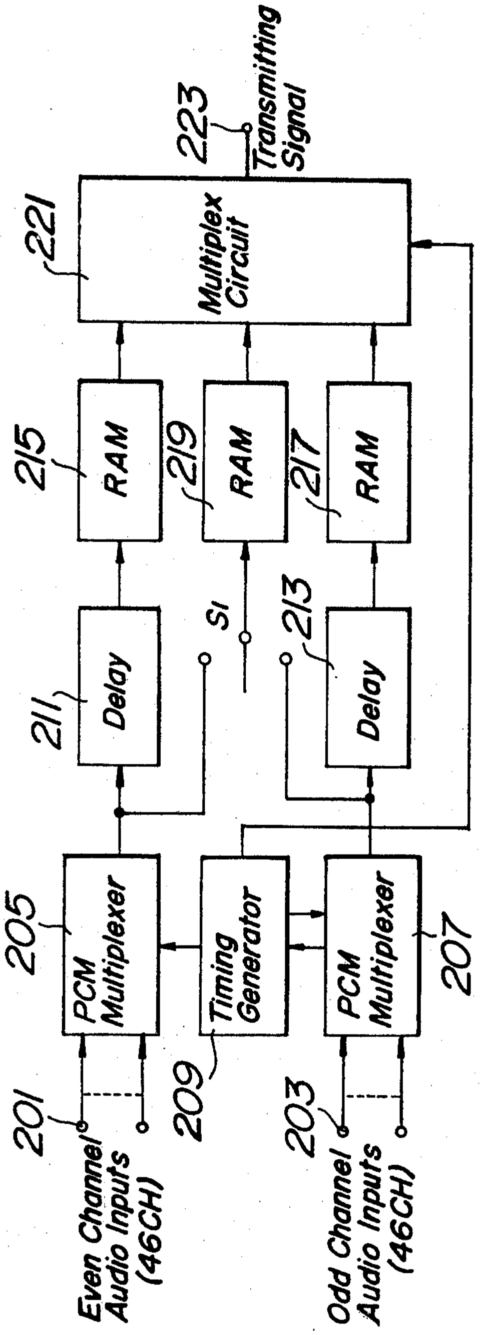
FIG. 12 is a block diagram of an embodiment of the transmitting apparatus at a transmitter end according to the invention.

FIG. 12 shows an embodiment of an arrangement at the transmitting end for transmitting new type signals illustrated in FIG. 10*b* according to this invention.

In FIG. 12, reference numerals 201 and 203 denote audio input terminals. For the sake of explanation, there are assumed to be 92 channels, i.e., No. 0 – 91 channels, and the audio input signals from even channels (46 CH) are supplied to said input terminals 201 and the remaining audio input signals from odd channels (46 CH) being supplied to said input terminals 203. These two groups of audio input signals are respectively applied to PCM multiplexers 205 and 207 which are similar in some respects to the multiplexer 45 in FIG. 3 and in which said audio input signals are multiplexed in time division in the form of a PCM signal after analogue-digital conversion. A block 209 shows a timing generator for generating many kinds of timing signals used for PCM multiplexing, control signals for controlling blocks 211 – 221 and a switch $S_1$ which will be described hereinafter, a common waveform synchronizing signal PFP and a mode control code MCC. The timing generator 209 is similar in some respects to the generator described in the co-pending application Ser. No. 361,581 (especially by reference to FIGS. 9 – 15). In this embodiment, the sampling frequency $f_{sa}$ is chosen to be $⅔f_h \approx$ 10.5 KHz, and the sampling pulses are applied to the PCM multiplexers 205 and 207 from the generator 209 so as to obtain 46 channels of PCM multiplexed signals. These signals correspond to the signals in audio channels $B_1$ and $B_2$ in FIG. 16. The PCM multiplex output signals from said PCM multiplexers 205 and 207 are respectively passed through delay circuits 211 and 213 which have delay times equal to two picture frames (2F) and one picture frame, respectively. These delay circuits may be formed with a delay line or digital memory device. The delayed output signals from said circuits 211 and 213 respectively correspond to the A and C channel signals in FIG. 1*c*. The delayed signals from the delay circuit 211 are applied to a random access memory (RAM) 215 so as to store the signals of 46 even channels during two PCM frame periods and to read out the thus stored signals at the timings of $R_0$, $R_0'$, $R_2$, $R_2'$, . . . $R_{90}$, $R_{90}'$, as shown in FIG. 10*b*, during the first horizontal synchronizing period within the subsequent two PCM frame periods. This RAM may be formed with TTL-LSI, MOS-LSI and so on, such as TTL-LSI: SN 74S200 of TEXAS INSTRUMENTS INC. The delayed signals from the delay circuit 211 during the subsequent two PCM frame periods are stored in another storage area of the RAM 215 and the thus stored signals are read out at the timings of $R_0$, $R_0'$, $R_2$, $R_2'$, . . . $R_{90}$, $R_{90}'$ in FIG. 10*b* during the first horizontal synchronizing period within the further subsequent two PCM frame periods. In this way the same is applicable to the processing of the subsequent signals. Since the RAM 215 is required to store the four samples for the respective audio signals of 46 channels, if one sample is formed with 8-bits, the RAM 215 has storage capacity equal to 46×4×8 = 1,472 bits.

In a similar way, the delayed signals derived from the delay circuit 213 are applied to a random access memory (RAM) 217 so as to store two samples of the signals of 46 odd channels during two PCM frame periods, and then to read out the thus stored signals at the timings of $R_1$, $R_1'$, $R_3$, $R_3'$, . . . $R_{91}$, $R_{91}'$, as shown in FIG. 10*b*, during the second horizontal synchronizing period within the subsequent two PCM frame periods. The delayed signals from the delay circuit 213 during the subsequent two PCM frame periods are also stored in another storage area of the RAM 217 and the thus stored signals are read out at the timings of $R_1$, $R_1'$, $R_3$, $R_3'$, . . . $R_{91}$, $R_{91}'$ during the second horizontal synchronizing period within the further subsequent two PCM frame periods. The same is applicable to the processing of the subsequent signals.

In FIG. 12, $S_1$ denotes an electronic switch which changes alternately in accordance with the first and second audio transmission periods $A_1F$ and $A_2F$. During the first $A_1F$ period, this switch $S_1$ is connected to the output terminal of the PCM multiplexer 205 so as to introduce the PCM multiplex output signals to a random access memory (RAM) 219 during said $A_1F$ period. In said RAM 219, the signals corresponding to the two samples of the respective 46 even channels during two PCM frame periods are stored, and then the thus stored signals are read out at the timings of $M_0$, $M_0'$, $M_2$, $M_2'$, . . . $M_{90}$, $M_{90}'$ in FIG. 10*b* during the third horizontal synchronizing period within the subsequent two PCM frame periods. The multiplex output signals from the multiplexer 205 during the subsequent two PCM frame periods are stored in another storage area of the RAM 219 and the thus stored signals are read out at the timings of $M_0$, $M_0'$, $M_2$, $M_2'$, . . . $M_{90}$, $M_{90}'$ during the third horizontal synchronizing period within the further subsequent two PCM frame periods. The same is applicable to the processing of the subsequent signals. During the second $A_2F$ period, said switch $S_1$ is connected to the output terminal of the PCM multiplexer 207 so as to introduce the PCM multiplex output signals to said RAM 219 during said $A_2F$ period. The RAM 219 operates in the same manner as described above, and the reading out procedure is executed at the timings of $M_1$, $M_1'$, $M_3$, $M_3'$, . . . $M_{91}$, $M_{91}'$ in FIG. 10*b*.

The output signals thus read out from said RAM 215, 217 and 219 and the output signals from the timing generator 209, i.e., the common waveform synchronizing signal PFP and the mode control code signal MCC are applied to a multiplex circuit 221 so as to produce a transmitting signal as shown in FIG. 10*b* from an output terminal 223 of said circuit 221.

Figures 13, 14:
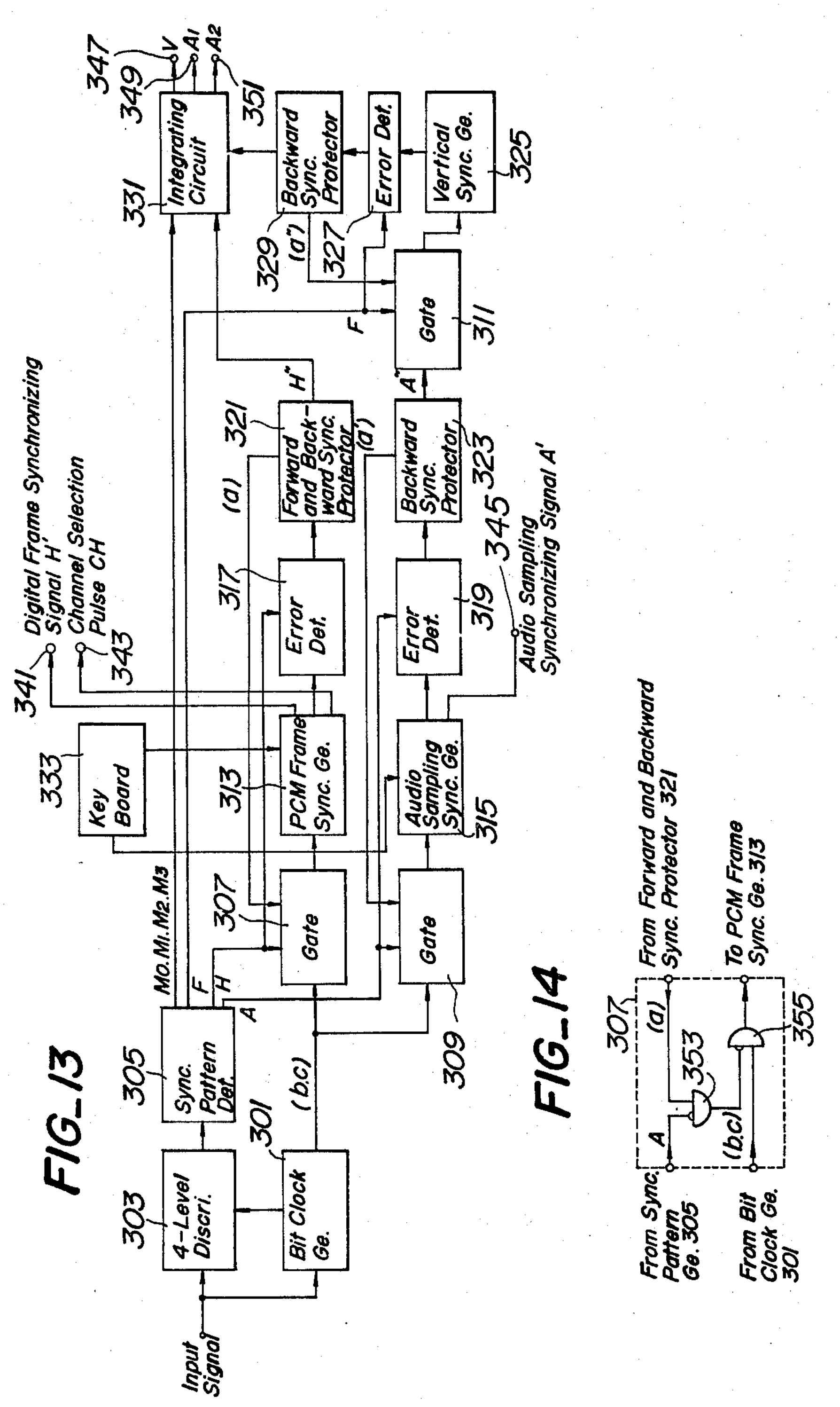
FIG. 13 is a block diagram of an embodiment of a synchronizing signal regenerating circuit according to the invention.
FIG. 14 is a circuit diagram of a gate shown in FIG. 13.
Figure 15:
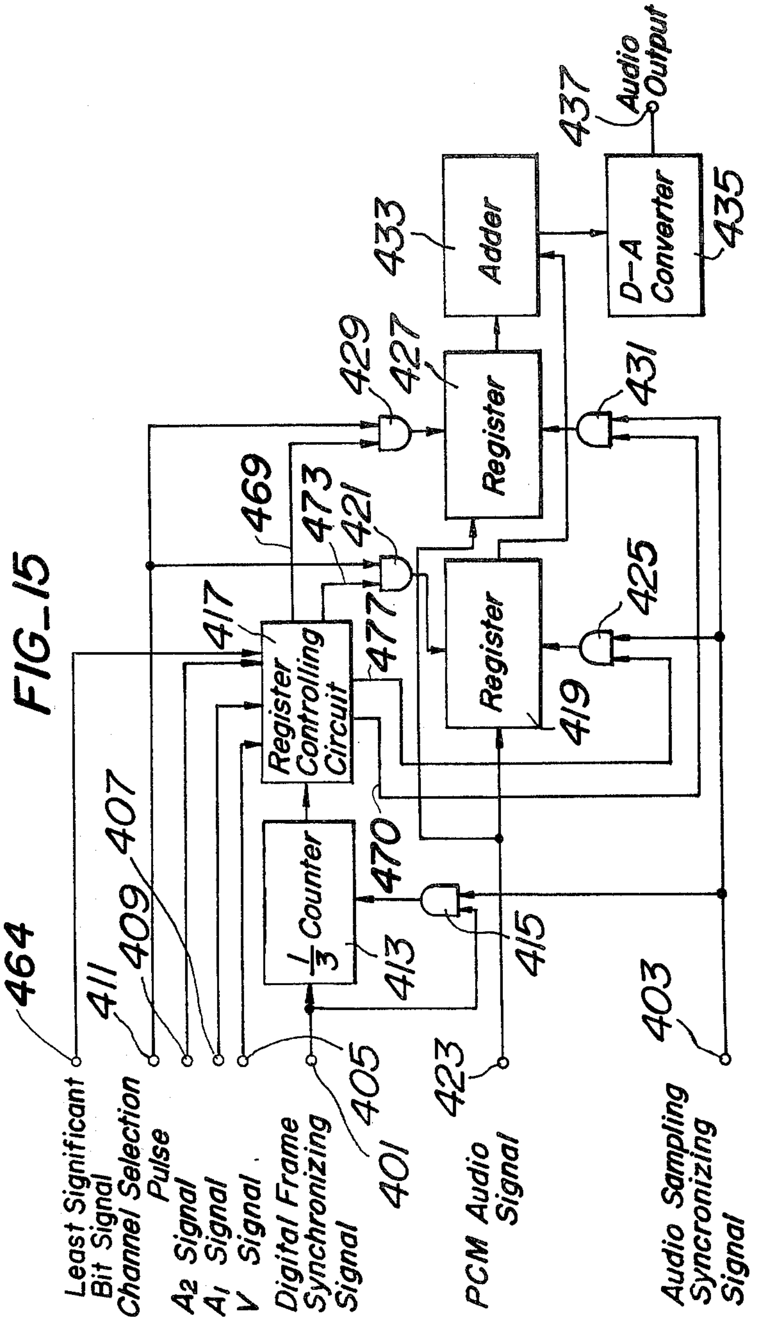
FIG. 15 is a block diagram of an embodiment of an audio reproducing circuit at the receiver end according to the invention.

Next, one embodiment of a receiver arrangement which receives the transmitted multiplex signals shown in FIG. 10*b* will be explained with reference to FIGS. 13 and 14. FIGS. 13 and 14 show one embodiment of the synchronizing signal regenerating circuit 153 in FIG. 9 according to the invention and FIG. 15 shows one embodiment of an audio reproducing circuit according to the invention. FIG. 16 illustrates time charts of many kinds of synchronizing signals used for reproducing the PCM audio signals.

In FIG. 13, the synchronizing signal regenerating circuit comprises a bit clock regenerator 301 which receives said input signal so as to extract bit clocks bc having one kind of period and synchronized with the PCM audio signals from the bit synchronizing frequency included in the PCM frame pattern PFP and the PCM signals in FIGS. 6 and 7. Said input signal is also applied to a four-level discriminator 303 which detects the four-levels of the four-level PCM audio signal (FIGS. 6 and 7) and also serving as a pulse shaper. A detailed construction of the bit clock regenerator 301 and the four-level discriminator 303 are similar in some respects to those described in the aforementioned copending application Ser. No. 361,581 (especially referring to FIGS. 23 and 18).

In the four-level discriminator 303, the input four-level audio PCM signal can be converted into an output two-level PCM audio signal. The four-level discriminator 303 also discriminates the digital synchronizing signal DS shown in FIG. 7. As shown in FIG. 6, the digital synchronizing signal DS is transmitted as a signal having the two extreme levels "0" and "3" of the four-level PCM audio signal. Therefore, it is sufficient to detect only the output signal supplied from the upper output terminal of the four-level discriminator 303 which is similar in some respects to that explained in the co-pending application Ser. No. 361,581 (especially referring to FIG. 20). Thus, as shown in FIG. 13 to the upper output terminal of the discriminator 303 is connected a synchronizing pattern detector 305. This detector 305 compares the output signal from the four-level discriminator 303 with the waveforms of PFP and MCC signals which have been previously set in the detector 305 and detects the PFP signal and then further detects the MCC signal on the basis of the detected PFP signal, so that the detector 305 produces the control signals A, H and F for synchronization and the signals $M_0$, $M_1$, $M_2$ and $M_3$ for indicating to which frame, the video frame VF, the first audio frame $A_1F$ or the second audio frame $A_2F$ the received signal belongs.

The synchronizing signal regenerating circuit shown in FIG. 13 further comprises gates 307, 309 and 311. The gate 307 produces a logical product of the horizontal synchronizing code signal H and a signal a having the same period as that of the digital frame synchronizing signal H' (FIG. 16*c*) and obtained by counting down the bit clocks bc (FIG. 16*b*) and is opened to pass the bit clocks bc when both signals coincide with each other. This gate may be formed, for example, with two inhibit gates 353 and 355, as shown in FIG. 14. The gate 309 forms a logical product of the audio sampling synchronizing code signal A and a signal *a'* having the same period as that of the audio sampling synchronizing signal A' (FIG. 16*d*) and obtained by counting down the bit clocks bc and is opened to pass the bit clocks bc when both signals coincide with each other. The gate 311 makes a logical product of the picture frame code signal F and a signal *a''* obtained by counting down the audio sampling synchronizing signal and having the same period as that of the television frame sychronizing signal and is opened to pass the bit clocks bc when both signals coincide so as to produce a signal having the same rate as that of the television frame.

Figures 16A, 16B, 16C, 16D, 16E:
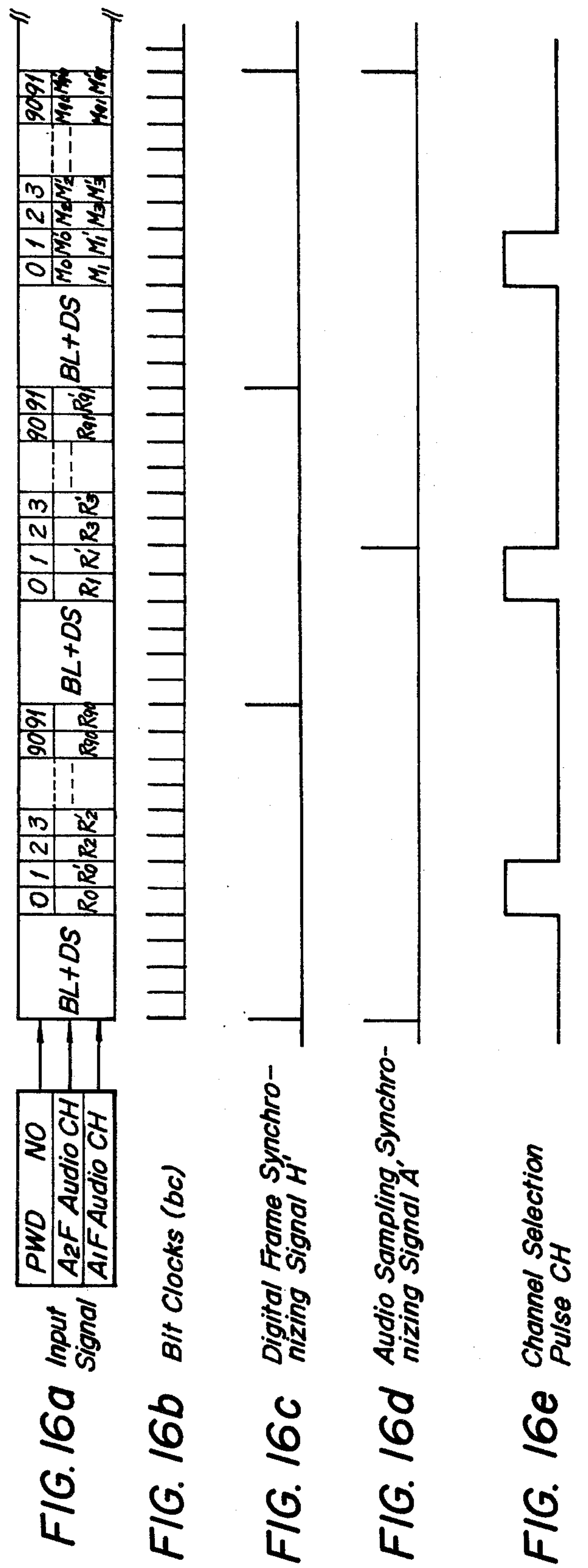
FIGS. 16*a* to 16*e* show time charts for explaining the operation of the PCM audio signal reproducing circuit shown in FIG. 15.

The bit clocks passed through the gate 307 are supplied to an audio PCM frame synchronizing signal generator 313 which may be formed with for example a counter. The generator 313 counts down the bit clocks of 6.545454 MHz by 1/416 so as to produce the digital frame synchronizing signal H' of 15.734 KHz and the channel selection pulse CH (FIG. 16*e*). FIG. 16*e* shows the channel selection pulses for extracting the Nos. 0 and 1 PWD in the case of the 0 channel being desired to be selected. The digital frame synchronizing signal H' and channel selection pulse CH are derived from output terminals 341 and 343, respectively. The bit clocks passed through the gate 309 are supplied to an audio sampling synchronizing signal generator 315 which may be also formed with a counter. The generator 315 counts down the bit clocks of 6.545454 MHz by 1/624 to produce the audio sampling synchronizing signal A' of 10.489 KHz. This audio sampling synchronizing signal A' is derived from an output terminal 345.

The generators 313 and 315 are followed by error detectors 317 and 319, respectively. The error detector 317 compares the output signal from the generator 313 with the signal H from the synchronizing pattern detector 305 and the error detector 319 compares the output signal from the generator 315 and the signal A from the detector 305 and they produce information indicating coincidence of these signals to a forward and backward synchronization protector 321 and a backward synchronization protector 323, respectively. The error detector 317 and protector 321 are similar to the error detector and protector explained in the above-mentioned copending application Ser. No. 361,581, from page 59, line 2 to page 61, line 19 with reference to FIG. 21 of the application, and the error detector 319 and protector 323 are also similar in some respects to the detector and protector explained in the same application Ser. No. 361,581, on page 61, lines 20–27 with reference to FIG. 22 of the application. The forward and backward synchronization protector 321 is triggered to derive the digital frame synchronizing signal H'' after establishment of synchronization when it receives successive ten coincidence outputs from the error detector 317 and once it has been actuated it wil hold its operating condition to produce the signal H'' until there drop out 10 successive coincidence outputs. The output a of the forward and backward synchronization protector 321 is fed back to the gate 307 in such a manner that during the operating condition of the protector 321, it controls the gate 307 so as to be always opened. The forward and backward synchronization protector 321 may be formed with a counter for counting the number of coincidences and a counter for counting the number of discordances, these counters being actuated by pulses having a given period (in this embodiment the digital frame period). If the synchronization has been stepped out, the discordance counter has begun to count the number of discordances, and after 10 successive discordances it counts up and at the same time the coincidence counter is reset and the output of the protector 321 is returned to zero. In case of the digital frame synchronization having been established after the coincidence counter has counted 10 successive coincidences, the coincidence counter counts up and its output becomes "1" to reset the discordance counter. Under a condition of an out-of-synchronization, i.e., a count up condition of the discordance counter, the coincidence counter has begun to count coincidences, and even if a single conincidence pulse is dropped out during the counting of 10 coincidences, the coincidence counter is immediately reset. In the same manner under a count up condition of the discordance counter, even if the discordance counter has begun to count several discordances, the discordance counter is immediately reset after appearing even a single coincidence pulse at a given timing before the discordance counter counts ten successive discordances. Thus the coincidence counter is not reset and the initial operating condition is maintained.

The backward synchronization protector 323 receives coincidence outputs from the error detector 319. Once the protector 323 is triggered to derive the audio sampling synchronizing signal A'' after establishment of synchronization, it holds its operating condition to produce the signal A'' until 10 successive coincidence outputs are lost. The output *a'* of the protector 323 is fed back to the gate 309, and during the actuation of the protector 323, it controls the gate 309 so as to always be opened. The reason why the backward synchronization protector 323 is not provided with a function of a forward synchronization protection is as follows. The synchronization is established in the audio PCM period and during this period the signal A'' is produced only once, although there are produced three digital frame synchronizing signals, so that if there once has been a forward synchronization, it is impossible to complete the synchronization pulling condition. The backward synchronization protector 323 may be formed with a counter for counting the number of discordances. The counter is reset to the initial condition even by a single coincidence pulse which appears before the counter will count 10 successive discordances.

The synchronizing signal regenerating circuit shown in FIG. 13 further comprises a vertical synchronizing signal generator 325 which counts the audio sampling synchronizing pulses supplied from the backward synchronization protector 323 through the gate 311 and generates the vertical synchronizing signal. The output signal from the generator 325 is supplied to an error detector 327 to which is also supplied the signal F from the synchronizing pattern detector 305. The error detector 327 compares these two signals so as to produce an output coincidence pulse when these timings coincide with each other. The coincidence pulse is supplied to a backward synchronization protector 329 which keeps its operating condition to produce the television frame synchronizing signal F until the error detector 327 does not detect more than ten successive discordances. During the operation of the protector 329, the output *a''* from the protector 329 controls the gate 311 to keep open, so that the audio sampling pulses can be supplied to the vertical synchronizing signal generator 325.

The signals $M_0$, $M_1$, $M_2$ and $M_3$ are applied to an integrating circuit 331 together with the established synchronizing signals H'' and F' from said protectors 321 and 329 in a manner that said signals $M_0$, $M_1$, $M_2$ and $M_3$ indicating the respective transmitting periods VF, $A_1F$ and $A_2F$ are integrated during one picture frame period. After this integration, the integrated signal decides whether the next frame belongs to the video frame VF, the first audio frame $A_1F$ or the second audio frame $A_2F$. This integration is advantageous against noise or erroneous operation. The signals V, $A_1$, $A_2$ indicating the respective transmission periods VF, $A_1F$ and $A_2F$ derived from said integrating circuit 331 are applied to output terminals 347, 349 and 351.

In FIG. 13, a reference numeral 333 denotes a keyboard for selecting the desired audio channel in which pulses for signal selection and for audio reproduction are generated. The former pulse is applied to the counter of said digital frame synchronizing signal generator 313 and the latter pulse is applied to said audio sampling synchronizing signal generator 315.

FIG. 15 shows an embodiment of an audio reproducing circuit at the receiver end according to the invention. This audio reproducing circuit is arranged subsequent to the synchronizing signal regenerating circuit shown in FIG. 13. Input terminals 401, 403, 405, 407, 409 and 411, respectively, receive the digital frame synchronizing signal H' of 15.75 KHz from the output terminal 341 in FIG. 13, the audio sampling synchronizing signal A' from the output terminal 345 in FIG. 13, the V signal from the output terminal 347 in FIG. 13, the $A_1$ signal from the output terminal 349 in FIG. 13, the $A_2$ signal from the output terminal 351 in FIG. 13 and the channel selection pulse CH from the output terminal 343 in FIG. 13. Connected to said input terminal 401 is a ⅓ counter 413 and an AND gate 415 to which said input terminal 403 is connected. The ⅓ counter 413 is reset by the logical product obtained from the AND gate 415, and after resetting the counter 413 counts the digital frame synchronizing signal H' so as to identify whether the transmitted digital frame corresponds to the real signal of even channel, the real signal of odd channel or the memory signal. The output of the counter 413 is applied to a register controlling circuit 417 together with the V, $A_1$ and $A_2$ signals. The channel selection pulse CH and the write-in signal from the output terminal 473 of the register controlling circuit 417 are applied to a write-in terminal of a register 419 through an AND gate 421. To the register 419 is applied the PCM audio signal from an audio input terminal 423. Two samples of the real portions of the PCM audio signal (i.e. 16 bits), for example, the signal contents of $R_0$ and $R_0'$ in FIG. **16*a* in case of selecting the 0 channel, are temporarily stored in the register 419 at the timing of the AND write-in signal from the gate 421. The audio sampling synchronizing signal A' and the read-out signal from the output terminal 477 of register controlling circuit 417 are applied to a read-out terminal of said register 419 through an AND gate 425. The signal stored in the register 419 is read-out at the period of 10.5 KHz by the AND read-out signal from the gate 425 during the $A_1F$ and $A_2F$ periods. The same is applied to a register 427 for interpolating the audio signal. That is to say, the CH pulse and the other write-in signal from the output terminal 469 of the register controlling circuit 417 are applied to a write-in terminal of the register 427 through an AND gate 429. To this register 427 is also applied the PCM audio signal from the terminal 423. Two samples (i.e. 16 bits) of the memory portions of the PCM audio signals of even channels, for example, the signal contents of $M_0$ and $M_0'$ in FIG. 16*a* in the case of selecting the No. 0 channel are stored in the register 427 at the period of ⅓ $t_h$ by the AND write-in signal from the gate 429, and two samples of the memory portion of the PCM audio signals of the odd channels, for example, the signal contents of $M_1$ and $M_1'$ in FIG. 16a in the case of selecting the No. 1 channel are stored in the register 427 at the period of ⅓ $t_h$ by the AND write-in signal from the gate 429. The audio sampling synchronizing signal A' and another read-out signal from the output terminal 470 of the controlling circuit 417 are applied to a read-out terminal of said register 427 through an AND gate 431. The signal stored in the register 427 is read-out at the period of the audio sampling synchronizing signal A', i.e. 10.5 KHz by the AND read-out signal from the gate 431 during the V period. The real and memory portions of the PCM audio signals read-out from the registers 419 and 427 are added to one another by an adder 433. The added PCM audio signal corresponds to the original PCM audio signal and has the real and memory signals as shown in FIG. 10a and is applied to a D-A converter 435 so as to reproduce the continuous audio signal which is derived from an audio output terminal 437.**

It should be noted that the present invention is not restricted to the embodiments explained above and many modifications may be possible within the scope of the invention.

For example, if a bandwidth of a transmission line is wide and an "eye" of the PCM signal transmision is sufficiently opened, it may be permissible to include a jitter to some extent in the bit clocks which are used to decode the PCM signal. In such a case it is not necessary to operate the bit clock generator 301 shown in FIG. 13 only for the PFP signal period, but the bit clock generator may be operated continuously just like in a case in which the digital frame synchronization has not yet been settled.

The waveforms of a transmission signal according to the invention can be modified as described in the co-pending application Ser. No. 361,581. That is to say, a synchronizing pilot signal may be added to the blanking portion of the signals in the video frame period and in the audio frame period. The amplitude of the synchronizing pilot signal can be separated. This synchronizing signal having the separable amplitude is used as a pilot signal so as to extract the PCM frame pattern in the received signal to generate bit clocks.

To the signal shown in FIG. 8 may be added a pilot signal having a frequency of the bit clock period or of integer multiples of the bit clock period or such a pilot signal may be transmitted through a separate line. In such a case the bit clocks can be more easily reproduced.

In the above embodiments the transmission system according to the invention has been explained for transmitting still pictures and their related sounds in a time division mode. However, the transmission system according to the invention is not limited to such a still picture and sound transmission system, but may be used to transmit television pictures and facsimile signals. In such a case, the horizontal synchronizing signal frequency of the video signal may be selected to be 15.75 KHz and a sampling frequency of the facsimile signal may be set to 31.5 KHz. In the same manner, the transmission system of the present invention may be used to transmit various signals such as a remote control signal, audio signals, facsimile signals in the form of PCM, PPM, PWM or PAM signals.

Advantageous effects of the transmission system according to the invention may be summarized as follows:

1. In a time division multiplexing transmission system for alternately transmitting the first and second information signals after dividing at periods of the first and second signals, the inserting period of the synchronizing signal can be made constant throughout the whole signal transmission period, so that the configuration of the circuit for regenerating the synchronizing signals can be simplified. Consequently the receiver can be manufactured cheaply.
2. Since only one kind of synchronizing signal is commonly inserted throughout the transmission period, it is possible to reduce the jitter of the regenerated bit clocks which occurs in case of the periods of the synchronizing signals being not constant such as the transmission system described in the co-pending application Ser. No. 361,581.
3. In case of transmitting the television picture signals and the PCM multiplexed audio signals as information signals by turns and even if the horizontal synchronizing frequency and the audio sampling frequency are different from one another, the insertion period of the synchronizing signal having common waveform is equal to the period of the horizontal synchronizing signal, so that the transmission system according to the invention is preferably video tape recorder apparatus and can be directly used with the video tape recorder. In addition, the circuit arrangement for demodulating the PCM multiplexed audio signal is not complicated and is not highly costly at the receiver end.
4. A device for maintaining the accurate synchronization by utilizing the above synchronizing signal and control signal can be constructed in a simple manner.
5. Since the synchronization can be maintained at any time instance, any kinds of signals which are divided into given periods can be transmitted in a time division mode.
6. Since the synchronization can be maintained at any time instance, different kinds of signals can be transmitted in a time division mode by turns at a time rate of any integer ratio. As the result, different signals can be accurately transmitted through a transmission line having a limited bandwidth.
7. The video signal and audio PCM signal can be transmitted in a time division mode in the same channel, so that a number of still pictures and their related sounds can be transmitted in a limited time interval. Therefore the video signal and audio PCM signal constituting a program can be transmitted repeatedly and thus it is not necessary to provide in a receiver a device for storing the whole program and the construction of the receiver can be simplified. Thus, a useful broadcasting system can be achieved.
8. An amount of each signal to be transmitted in a given time interval with maintaining the synchronizing condition can be selected to be an arbitrary value.
9. Therefore, a degree of freedom of expressing the contents of programs can be increased while keeping the synchronizing condition.

What is claimed is:

1. A time division multiplexing transmission system for transmitting video signals and a plurality of channels of PCM-TDM audio signals alternately, said video and audio signals being divided into video and audio frames, each of which has an equal time duration of a predetermined unit frame period and the video and audio signals being transmitted in a sequence of one video frame and subsequently first and second audio frames, said transmission system comprising at a transmitter end means for producing video signals under control of horizontal and vertical synchronizing signals having predetermined periods, respectively;

a gate means for alternately passing said audio and video signals at a time rate of a given integer ratio;

a digital synchronizing signal generator for producing audio and video digital synchronizing signals which are composed of a synchronizing information signal having a first pulse chain of a given repetition frequency and of audio and video control signals, respectively, each having a second pulse chain, the pulses of said first and second pulse chains appearing at given time slots, said audio and video digital synchronizing signals being produced at the video signal period, said synchronizing information signal of the given repetition frequency being of common waveform in both of the audio and video frame periods, and the contents of said audio and video control signals, both of which are produced in the video signal period, being different from one another;

first and second PCM multiplexing means for receiving respective groups of audio channel signals, each receiving half of said plurality of channels of audio signals, and for multiplexing said groups of audio channel signals in time division in the form of PCM signals, respectively, so as to form first and second signal series of PCM-TDM signals, respectively, each signal series containing a plurality of PCM frames, each of which has a PCM frame period equal to an integer ratio of the predetermined period of the horizontal synchronizing signal and includes a plurality of PCM time slots to which said audio channel signals are allotted interruptedly in a predetermined PCM time slot sequence in which a real signal to be reproduced directly and a memory signal to be reproduced after temporary storage are presented alternately, under control of a PCM synchronizing signal having a period equal to an integer ratio of the predetermined period of the horizontal synchronizing signal;

first and second delay means, having first and second delay times equal to first and second integer multiples of said unit frame period, respectively, for delaying said first and second series of PCM-TDM signals, respectively;

an electronic switching means coupled to said first and second PCM multiplexing means, changeable alternately at every frame period, for selectively deriving said first and second series of PCM-TDM signals therefrom;

first memory means, coupled to said first delay means, for storing the delayed first series of PCM-TDM signals during a time duration equal to an integer multiple of said PCM frame period and for reading out the delayed first series at a first repeating interval of the time slot during every first PCM synchronizing period within the PCM frame periods;

second memory means, coupled to said second delay means, for storing the delayed second series of PCM-TDM signals during a time duration equal to said integer multiple of said PCM frame period and for reading out the delayed second series at a second repeating interval of said time slot during every second PCM synchronizing period within the PCM frame periods;

third memory means, coupled to said switching means, for storing either one of the first or second series of PCM-TDM signals selectively derived from said switching means during a time duration equal to an integer multiple of said PCM frame period at a third repeating interval of said time slot during every third PCM synchronizing period within the PCM frame periods, so as to change said PCM time slot sequence in which a group of real signals and a group of memory signals are gathered separately;

third multiplexing means, coupled to said first, second and third memory means, for multiplexing read out signals therefrom together with said audio and video digital synchronizing signals;

and said transmission system further comprises at a receiver end first means for extracting said pulse chain having the given repetition frequency from said synchronizing information signal of the common waveform inserted in multiplexed audio and video information signals which are transmitted alternately in said sequence and for producing clock pulses having a repetition frequency which is equal to said repetition frequency of said extracted pulse chain;

second means for extracting said audio and video control signals on the basis of the reproduced clock pulses;

means for forming audio and video synchronizing signals, respectively, from the reproduced clock pulses, said audio and video synchronizing signals and said extracted audio and video control signals being collated to each other and said means for forming said audio and video synchronizing signals being controlled by a collation output so as to produce said audio and video synchronizing signals, respectively, in synchronism with a transmitted signal, and said audio and video information signals being reproduced by means of the formed audio and video synchronizing signals; and means for reproducing an audio information signal divided at the audio signal period from said multiplexed audio information signal divided at said video signal period by rearranging the time positions of the time slots in said multiplexed audio information signal.

2. A time division multiplexing transmission system as claimed in claim 1, comprising means for adding to said audio and video control signals control signals representative of a period equal to a least common multiple of said audio and video signal periods at every period equal to said least common multiple so as to indicate the timing of said audio signal period.

3. A time division multiplexing transmission system as claimed in claim 1, transmitter the time duration during which audio and video information signals are transmitted alternately is equal to an integer multiple of the least common multiple of said audio and video signal periods.

4. A time division multiplexing transmission system as claimed in claim 3, wherein a period of said pulse chain of said given repetition frequency constructing said synchronizing information signal is equal to a period of an original clock signal of a given frequency.

5. A time division multiplexing transmission system as claimed in claim 4, wherein said synchronizing information signal of said digital synchronizing signal is formed of a pulse modulation frame synchronizing signal of a fixed pattern, said audio and video control signals are formed of a mode control code, which mode control code comprises a code bit for indicating a coincidence of the digital synchronizing signal and the horizontal synchronizing signal, a code bit for indicating a coincidence of the digital synchronizing signal and a pulse modulation frame synchronizing signal at a period equal to said least common multiple of said audio and video signal periods, a code bit for indicating a coincidence of the digital synchronizing signal and a video vertical synchronizing signal and at least one code bit for representing the video signal transmission period or the audio signal transmission period.

6. A time division multiplexing transmission system as claimed in claim 5, wherein said pulse modulation frame synchronizing signal of a fixed pattern is constructed of a substantially regular pattern having partially irregular portions.

7. A time division multiplexing transmission system as claimed in claim 1, wherein an integer ratio between periods in which said audio and video signals are transmitted alternately is made equal to an integer ratio of a television frame period.

8. A time division multiplexing transmission system as claimed in claim 7, wherein a horizontal signal frequency is made equal to a horizontal synchronizing frequency of a television signal.

9. A time division multiplexing transmission system as claimed in claim 8, wherein the given frequency of an original signal has a relation of an integer ratio with respect to a color sub-carrier frequency of a color television signal.

10. A time division multiplexing transmission system as claimed in claim 1, wherein said integer ratio of said PCM frame period is 2.

11. A time division multiplexing transmission system as claimed in claim 10, wherein real signals in PCM time slots of even numbers during two PCM frame periods are gathered so as to be allotted to a first period of said two PCM frame periods, real signals in time slots of odd numbers during said PCM frame periods are gathered so as to be allotted to a second period of said two PCM frame periods, and memory signals during said two PCM frame periods are gathered so as to be allotted to a third period of said two PCM frame periods.

12. A time division multiplexing transmission system as claimed in claim 10, wherein real signals in said first signal series are gathered so as to be alloted to a first period of two PCM frame periods, real signals in said second signal series are gathered so as to be alloted to a second period of said two PCM frame periods, and memory signals during said two PCM frame periods are gathered so as to be allotted to a third period of said two PCM frame periods.

13. A transmitter for use in a time division multiplexing transmission system for transmitting video signals and a plurality of channels of PCM-TDM audio signals alternately, said video and audio signals being divided into video and audio frames, each of which has an equal time duration of a predetermined unit frame period, and the video and audio signals being transmitted in a sequence of one video frame and subsequently first and second audio frames, comprising:

means for producing video signals under control of horizontal and vertical synchronizing signals having predetermined periods, respectively;

a gate means for alternately passing said audio and video signals at a time rate of a given integer ratio;

a digital synchronizing signal generator for producing audio and video digital synchronizing signals which are composed of a synchronizing information signal having a first pulse chain of a given repetition frequency and of audio and video control signals, respectively, each having a second pulse chain, the pulses of said first and second pulse chains appearing at given time slots, said audio and video digital synhronizing signals being produced at the video signal period, said synchronizing information signal of the given repetition frequency being of common waveform in both of the audio and video frame periods, and the contents of said audio and video control signals, both of which are produced in the video signal period, being different from one another;

first and second PCM multiplexing means for receiving respective groups of audio channel signals, each receiving half of said plurality of channels of audio signals, for multiplexing said groups of audio channel signals in time division in the form of PCM signals, respectively, to form first and second signal series of PCM-TDM signals, respectively, each signal series containing a plurality of PCM frames, each of which has a PCM frame period equal to an integer ratio of the predetermined period of the horizontal synchronzing signal and includes a plurality of PCM time slots to which said audio channel signals are allotted interruptedly in a predetermined PCM time slot sequence in which a real signal to be reproduced directly and a memory signal to be reproduced after temporary storage are presented alternately, under control of a PCM synchronizing signal having a period equal to an integer ratio of the predetermined period of the horizontal synchronizing signal;

first and second delay means, having first and second delay times equal to first and second integer multiples of said unit frame period, respectively, for delaying said first and second series of PCM-TDM signals, respectively;

an electronic switching means coupled to said first and second PCM multiplexing means, changeable alternatively at every frame period, for selectively deriving said first and second series of PCM-TDM signals therefrom;

first memory means, coupled to said first delay means, for storing the delayed first series of PCM-TDM signals during a time duration equal to an integer multiple of said PCM frame period and for reading out the delayed first series at a first repeating interval of the time slot during every first PCM synchronizing period within the PCM frame periods;

second memory means, coupled to said second delay means, for storing the delayed second series of PCM-TDM signals during a time duration equal to said integer multiple of said PCM frame period and for reading out the delayed second series at a second repeating interval of said time slot during every second PCM synchronizing period within the PCM frame periods;

third memory means, coupled to said switching means, for storing either one of the first or second series of PCM-TDM signals selectively derived from said switching means during a time duration equal to an integer multiple of said PCM frame period at a third repeating interval of said time slot during every third PCM synchronizing period within the PCM frame periods, so as to change said PCM time slot sequence in which a group of real signals and a group of memory signals are gathered separately; and third multiplexing means, coupled to said first, second and third memory means, for multiplexing read out signals therefrom together with said audio and video digital synchronizing signals.

14. A transmitter as claimed in claim 12, wherein said digital synchronizing signal generator comprises:

a signal generator for producing a bit clock signal having a given frequency;

a first circuit for producing an audio digital synchronizing signal having a first frequency which is equal to a fraction of an integer of said given frequency of said bit clock;

a second circuit for producing a video digital synchronizing signal having a second frequency which has a relation of an integer ratio with respect to said first frequency;

a third circuit for producing a third signal having a third frequency which is equal to fractions of integers of said first and second frequencies;

a fourth circuit for producing a fourth signal having a fourth frequency which is equal to a fraction of an integer of said third frequency;

a gate circuit for alternately passing said audio and video digital synchronizing signals at a time rate of said integer ratio under a control of a gate signal formed by said fourth signal; and a shift register which is triggered by an output signal from said gate circuit and produces a digital synchronizing signal composed of synchronizing information including a pulse chain of a given repetition frequency and first and second control signals each including a pulse chain, the pulses of the pulse chains appearing at given time slots in synchronism with the occurrence of said audio and video digital synchronizing signals and third signal, said synchronizing information of the given repetition frequency being of the common waveform in both of said audio and video digital synchronizing periods, but said first control signal in the audio period being different from said second control signal in the video signal period; whereby said synchronizing information and first control signal are inserted in said audio information signal divided at said audio signal period and said synchronizing information and second control signal are inserted in said video information signal divided at said video signal period.

15. A transmitter as claimed in claim 14, wherein each of said first, second, third and fourth circuits is constructed of a frequency divider.

16. A transmitter as claimed in claim 13 wherein said digital synchronizing signal generator is formed by the shift register having a plurality of parallel input terminals, a series input terminal, a series output terminal and a parallel enable terminal for changing a mode of said shift register so as to permit parallel inputs; wherein to parallel input terminals for setting the synchronizing information is supplied a fixed input signal corresponding to said pulse chain of said synchronizing information; wherein to parallel input terminals for setting said control signal are supplied said audio digital synchronizing signal, video digital synchronizing signal and third signal, separately; wherein to said parallel enable terminal is supplied an output signal from a gate circuit; and wherein to said series input terminal is supplied a bit clock of a given frequency; whereby said audio or video digital synchronizing signal supplied to said parallel intput terminal is written in said shift register and the content in the shift register is shifted by said bit clock of the given frequency supplied to said series input terminal so as to produce from said series output terminal a pulse chain forming said synchronizing information and a pulse chain forming said first or second control signal at the given period of said bit clock.

17. A receiver for use in a time division multiplexing transmission system having a transmitter for transmitting video signals and a plurality of channels of PCM-TDM audio signals alternatively, said video and audio signals being divided into video and audio frames, each of which has an equal time duration of a predetermined unit frame period, and the video and audio signals being transmitted in a sequence of one video frame and subsequently first and second audio frames, in which the transmitter includes means for producing video signals under control of horizontal and vertical synchronizing signals having predetermined periods, respectively, a gate means for alternately passing said audio and video signals at a time rate of a given integer ratio, a digital synchronizing signal generator for producing audio and video digital synchronizing signals which are composed of a synchronizing information signal having a first pulse chain of a given repetition frequency and of audio and video control signals, respectively, each having a second pulse chain, the pulses of said first and second pulse chains appearing at given time slots, said audio and video digital synchronizing signals being produced at the video signal period, said synchronizing information signal of the given repetition frequency being of common waveform in both of the audio and video frame periods, and the contents of said audio and video control signals, both of which are produced in the video signal period, being different from one another, first and second PCM multiplexing means for receiving respective groups of audio channel signals, each receiving half of said plurality of channels of audio signals, for multiplexing said groups of audio channel signals in time division in the form of PCM signals, respectively, to form first and second signal series of PCM-TDM signals, respectively, each signal series containing a plurality of PCM frames, each of which has a PCM frame period equal to an integer ratio of the predetermined period of the horizontal synchronizing signal and includes a plurality of PCM time slots to which said audio channel signals are allotted interruptedly in a predetermined PCM time slot sequence in which a real signal to be reproduced directly and a memory signal to be reproduced after temporary storage are presented alternately, under control of a PCM synchronizing signal having a period equal to an integer ratio of the predetermined period of the horizontal synchronizing signal, first and second delay means, having first and second delay times equal to first and second integer multiples of said unit frame period, respectively, for delaying said first and second series of PCM-TDM signals, respectively, an electronic switching means coupled to said first and second PCM multiplexing means, changeable alternately at every frame period, for selectively deriving said first and second series of PCM-TDM signals therefrom, first memory means, coupled to said first delay means, for storing the delayed first series of PCM-TDM signals during a time duration equal to an integer multiple of said PCM frame period and for reading out the delayed first series at a first repeating interval of the time slot during every first PCM synchronizing period within the PCM frame periods, second memory means, coupled to said second delay means, for storing the delayed second series of PCM-TDM signals during a time duration equal to said integer multiple of said PCM frame period and for reading out the delayed second series at a second repeating interval of said time slot during every second PCM synchronizing period within the PCM frame periods, third memory means, coupled to said switching means, for storing either one of the first or second series of PCM-TDM signals selectively derived from said switching means during a time duration equal to an integer multiple of said PCM frame period at a third repeating interval of said time slot during every third PCM synchronizing period within the PCM frame periods, so as to change said PCM time slot sequence in which a group of real signals and a group of memory signals are gathered separately; and third multiplexing means, coupled to said first, second and third memory means, for multiplexing read out signals therefrom together with said audio and video digital synchronizing signals, said receiver comprising:

first means for extracting said pulse chain having the given repetition frequency from said synchronizing information signal of the common waveform inserted in multiplexed audio and video information signals which are transmitted alternately in said sequence and for producing clock pulses having a repetition frequency which is equal to said repetition frequency of said extracted pulse chain;

second means for extracting said audio and video control signals on the basis of the reproduced clock pulses;

means for forming audio and video synchronizing signals, respectively, from the reproduced clock pulses, said audio and video synchronizing signals and said extracted audio and video control signals being collated to each other and said means for forming said audio and video synchronizing signals being controlled by a collation output so as to produce said audio and video synchronizing signals, respectively, in synchronism with a transmitted signal, and said audio and video information signals being reproduced by means of the formed audio and video synchronizing signals; and means for reproducing an audio information signal divided at the audio signal period from said multiplexed audio information signal period from said multiplexed audio information signal divided at said video signal period by rearranging the time positions of the time slots in said multiplexed audio information signal.

18. A receiver as claimed in claim 17 wherein said means for forming said audio and video synchronizing signals comprises a first synchronizing signal generating circuit and a second synchronizing signal generating circuit, these circuits being connected in parallel to said clock pulse producing means;

said first synchronizing signal generating circuit including a first gate connected to said clock pulse producing means; and a first synchronizing signal generator having a counter for counting clock pulses passed through said first gate and producing an output signal of the audio sampling frequency and a first error detector and a backward synchronization protector which detects a coincidence between said audio control signal from said control signal extracting means and said output signal from said first synchronizing signal generator and provides a conditioning signal to said first gate in a way that said first gate is always opened before said backward synchronization protector detects said coincidence, wherein after the backward synchronization protector detects said coincidence, said first gate is opened only for the digital synchronizing signal period in the transmitted signal so as to establish a synchronous condition of the first synchronizing signal and after the synchronous condition has been established, said first gate is opened only for the digital synchronizing signal period unless said backward synchronization protector detects a given number of successive discordances between said audio control signal and said output signal from said first synchronizing signal generator; and wherein said second synchronizing signal generator circuit includes a second gate connected to said clock pulse producing means, and a second synchronizing signal generator having a counter for counting clock pulses passed through said second gate and producing an output signal of the horizontal synchronizing frequency and a second error detector and a forward and backward synchronization protector which detects a coincidence between said video control signal from said control signal extracting means and said output signal from said second synchronizing signal generator and produces such conditioning signals to said second gate that in an asynchronous condition of the second synchronizing signal said second gate is always opened until said synchronization protector detects a given number of successive coincidences, after the synchronization protector has detected said given number of successive coincidences, said second gate is opened only for the digital synchronizing signal period in the transmitted signal so as to establish a synchronous condition of the video synchronizing signal and after the synchronous condition has been established, said second gate is opened only for the digital synchronizing signal period unless said synchronization protector detects a given number of successive discordances between said video control signal and said output signal from said second synchronizing signal generator;

whereby said first and second synchronizing signal generating circuits are made operative simultaneously so as to generate said audio and video synchronizing signals independently.

19. A receiver as claimed in claim 18 wherein said forward and backward synchronization protector comprises a first AND gate for detecting said coincidences;

a second AND gate for detecting said discordances;

a coincidence counter for counting said coincidences and producing an output coincidence signal when it counts said given number of successive coincidences;

a discordance counter for counting said discordances and producing an output discordance signal when it counts said given number of successive discordances; and a third AND gate for receiving said output synchronizing signal from said synchronizing signal generator and said output discordance signal and producing said conditioning signal, whereby said discordance counter and said coincidence counter are reset by said output coincidence signal and said output discordance signal, respectively.

20. A receiver as claimed in claim 18 wherein said backward synchronization protector comprises a first AND gate for detecting said discordances;

a discordance counter for counting said discordances and producing an output discordance signal when it counts said given number of successive discordances;

a second AND gate for detecting said coincidence and supplying said coincidence as a reset signal to said discordance counter; and a third AND gate for receiving said synchronizing signal generated from said synchronizing signal generator and said output discordance signal and producing said conditioning signal.

21. A receiver as claimed in claim 18, wherein said means for extracting said control signal comprises a shift register having a plurality of stages, the number of which is at least equal to the number of bits forming said digital synchronizing signal in the transmitted signal, the successive bits of the digital synchronizing signal of the transmitted signal being written in successive stages of said shift register;

a coincidence detector having comparison input terminals connected to given stages of said shift register corresponding to the synchronizing information signal of the given pattern and reference input terminals connected to given potentials in accordance with said given pattern of said synchronizing information; and a gate circuit having one input terminal connected to the output of said coincidence detector and the other intput terminals connected to given stages of said shift register corresponding to the control signal.

22. A receiver as claimed in claim 18, wherein said means for producing the clock pulses comprises a gate for receiving an intput transmitted signal;

a phase comparator connected to an output of said gate;

a sample-hold circuit connected to said phase comparator; and a controlled oscillator for producing said clock pulses, said clock pulses generated from said oscillator being fed back to said phase comparator so as to produce an output corresponding to a phase error between the input signal and said clock pulses, whereby in the asynchronous condition said gate and said sample-hold circuit are made always operative and after the synchronous condition has been established, said gate and sample-hold circuit are made operative only for the digital synchronizing signal period of the transmitted signal.

23. A receiver as claimed in claim 18 which further comprises a ⅓ counter for counting reproduced second synchronizing signals after resetting said ⅓ counter by the logical product signal of reproduced audio and video synchronizing signals so as to identify whether the transmitted multiplexed audio signal divided at the audio sampling period corresponds to the signal transmitted through an even or odd channel during the period of said audio frame period or the signal transmitted during the period of said video information signal period;

a first register for storing a multiplexed PCM audio information signal, divided at the audio sampling period and transmitted during the horizontal synchronizing period and for reading out the thus stored signal at the horizontal synchronizing period during the audio frame period, respectively, under control of identification output signals from said ⅓ counter;

a second register for storing the multiplexed PCM audio signal corresponding to the video frame period and for reading out the thus stored signal at the video frame period, respectively, under control of identification output signals from said ⅓ counter;

an adder for adding the read-out signals from said first and second registers; and a digital-to-analogue converter for converting the output signal from said adder to an analogue signal so as to reproduce the continuous audio signal.

* * * * *